C. M. F. FRIDEN

Aug. 1, 1933. CALCULATING MACHINE Re. 18,911

Original Filed Feb. 18, 1924 8 Sheets-Sheet 1

INVENTOR
Carl M. F. Friden.
by White Prost & Evans
his ATTORNEYS

C. M. F. FRIDEN

Aug. 1, 1933. CALCULATING MACHINE Re. 18,911

Original Filed Feb. 18, 1924 8 Sheets-Sheet 2

INVENTOR
Carl M. F. Friden
by White Prost & Evans
his ATTORNEYS

Aug. 1, 1933.

C. M. F. FRIDEN

CALCULATING MACHINE

Re. 18,911

Original Filed Feb. 18, 1924

8 Sheets-Sheet 3

INVENTOR
Carl M. F. Friden
by White Prost & Evans
his ATTORNEYS

C. M. F. FRIDEN
Aug. 1, 1933. CALCULATING MACHINE Re. 18,911
Original Filed Feb. 18, 1924 8 Sheets-Sheet 4
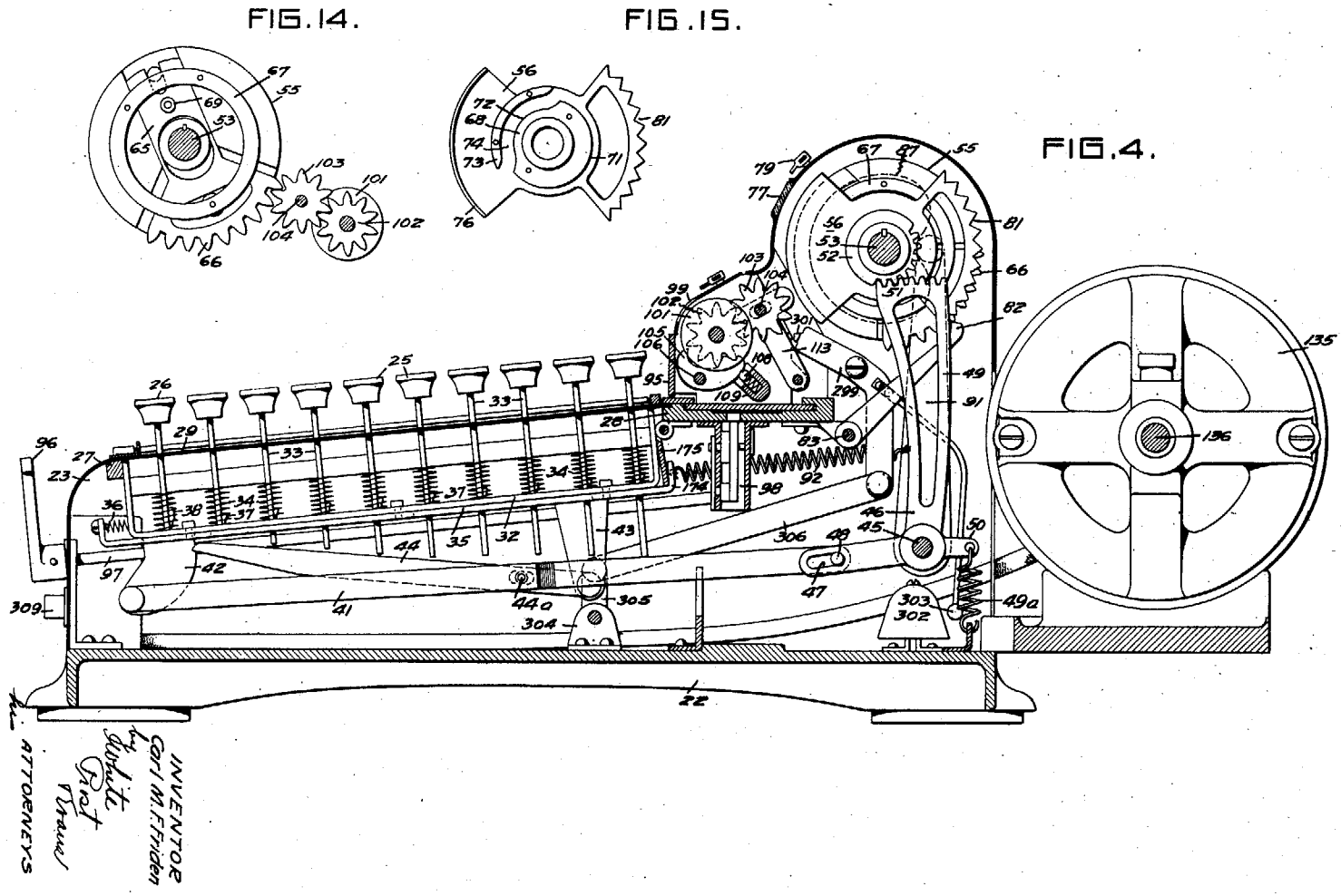

C. M. F. FRIDEN

Aug. 1, 1933. CALCULATING MACHINE Re. 18,911

Original Filed Feb. 18, 1924 8 Sheets-Sheet 5

INVENTOR
Carl M. F. Friden
by J. White
Prost
Traw
his ATTORNEYS

C. M. F. FRIDEN
Aug. 1, 1933. CALCULATING MACHINE Re. 18,911
Original Filed Feb. 18, 1924 8 Sheets-Sheet 6
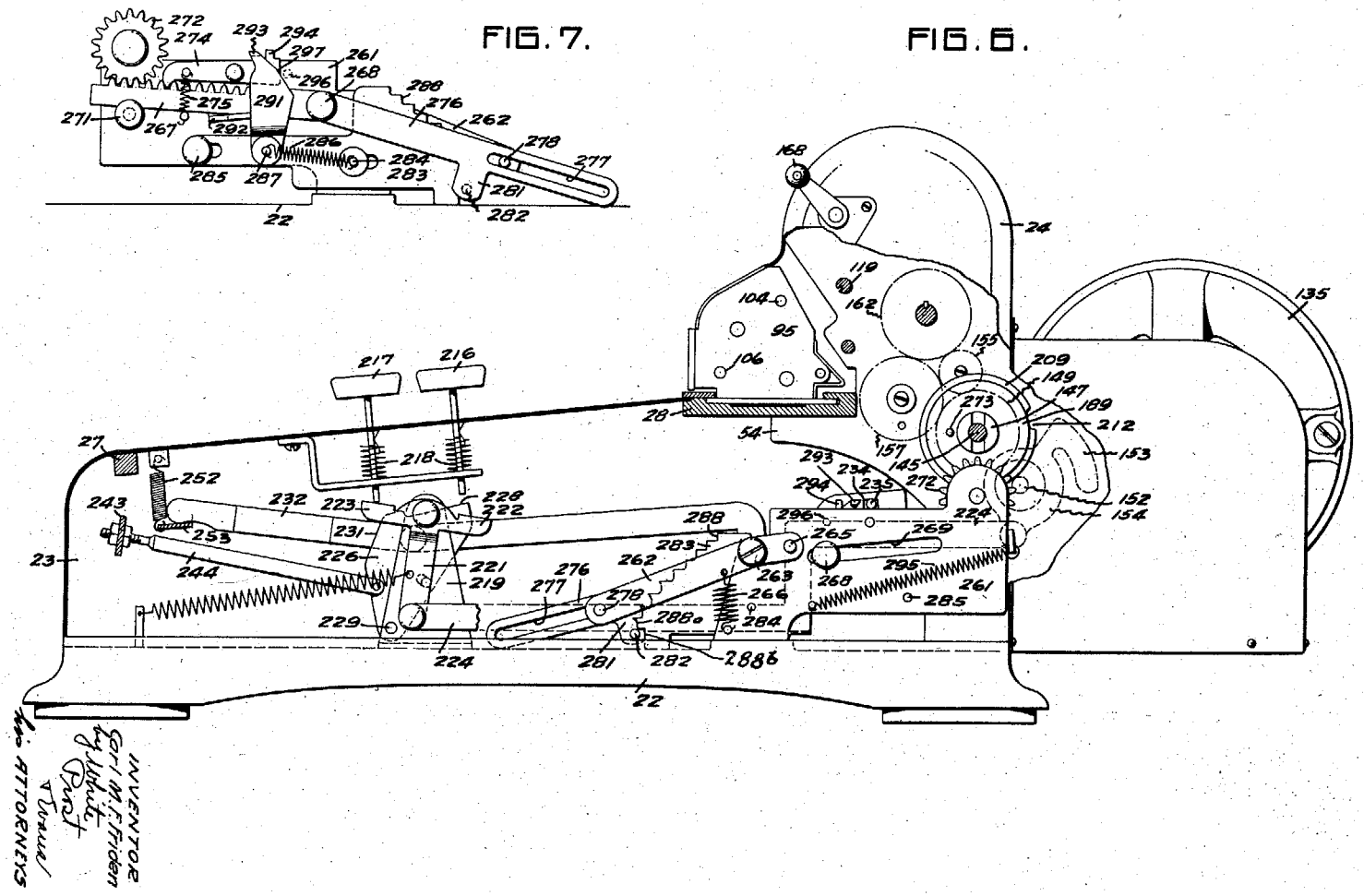

C. M. F. FRIDEN
Aug. 1, 1933. CALCULATING MACHINE Re. 18,911
Original Filed Feb. 18, 1924 8 Sheets-Sheet 7
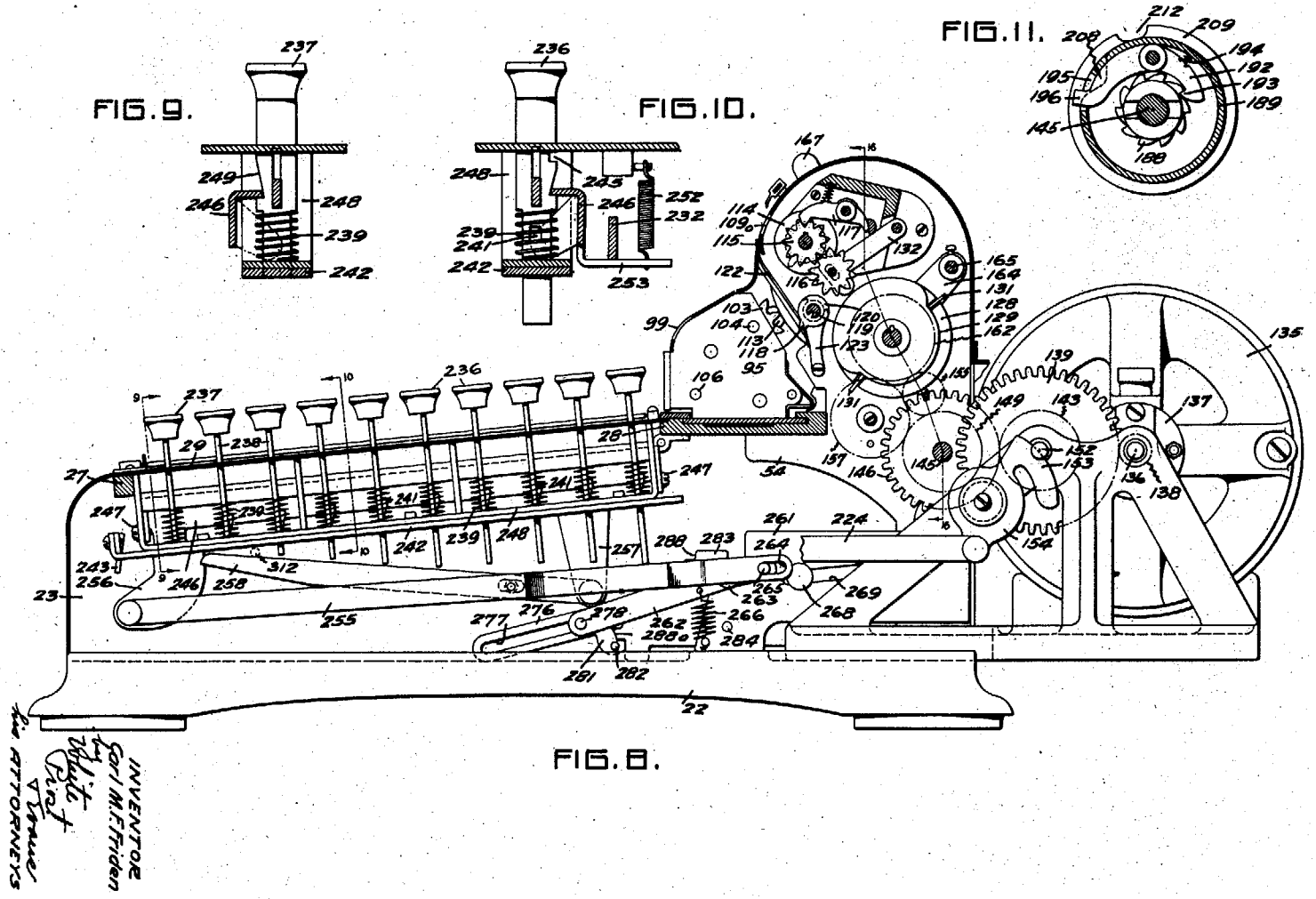

Aug. 1, 1933. C. M. F. FRIDEN Re. 18,911

CALCULATING MACHINE

Original Filed Feb. 18, 1924 8 Sheets-Sheet 8

INVENTOR
Carl M. F. Friden
by White Prost & Evans
his ATTORNEYS

Reissued Aug. 1, 1933

Re. 18,911

UNITED STATES PATENT OFFICE 18,911

CALCULATING MACHINE

Carl M. F. Friden, Piedmont, Calif., assignor to Marchant Calculating Machine Company, Emeryville, Calif., a Corporation of California Original No. 1,643,710, dated September 27, 1927, Serial No. 693,546, February 18, 1924. Application for reissue September 14, 1929. Serial No. 392,564

120 Claims. (Cl. 235—82)

The invention relates to calculating machines and particularly to calculating machines adapted to perform the operations of addition, subtraction, multiplication and division and is a continuation in part of my application No. 539,422 filed February 27th, 1922.

An object of the invention is to provide a calculating machine in which the multiplication or division of a number by any digit is accomplished by the depression of a key.

Another object of the invention is to provide a calculating machine in which the mental operation involved in the problems of division or multiplication is completed by the introduction of the digit multiplier or divisor into the machine.

Another object of the invention is to provide a calculating machine which is automatic in its operation to compute problems involving division and multiplication.

A further object of the invention is to provide a power driven calculating machine in which the operation of the machine is initiated, in problems of multiplication and division, by the depression of a digit key representing one of the factors of the calculation.

A further object of the invention is to provide a universal rotation control mechanism which is adapted to be operated by either the plus or minus control keys for manually determining the extent and direction of rotation of the actuator, and by value keys for automatically predetermining the number of rotations of the actuator.

A further object of the invention is to provide a calculating machine which may be operated to add a given number a plurality of times without changing the setting of the machine.

A further object of the invention is to provide a calculating machine which is operative to perform problems in addition and multiplication without change in the setting of the machine.

A further object of the invention is to provide a power driven calculating machine having means operable during the operation of division to stop the operation of the machine when the divisor will not go into the dividend a whole number of times.

A further object of the invention is to provide a power driven calculating machine provided with means for disconnecting the source of power from the machine when the machine has completed the calculating operation.

The invention possesses many other advantageous features, some of which, with the foregoing, will be set forth at length in the following description, where I shall outline in full, that form of the invention which I have selected for illustration in the drawings accompanying and forming part of the present specification. In said drawings I have shown one embodiment of my invention but it is to be understood that I do not limit myself to such form, since the invention, as set forth in the claims, may be embodied in a plurality of forms.

It is manifest that the invention comprising the means for automatically stopping the operation of the calculating machine, after the calculation has been completed, may be combined with any suitable form of calculating mechanism. In the accompanying drawings I have shown the invention embodied in a calculating machine comprising a counting mechanism actuating device consisting of a rotatable drum in which the values to be calculated are introduced, but it is to be understood that the invention is not limited to use in connection with a calculating machine having a counting mechanism actuating device of this character or to a machine having a rotatable drum for performing the calculating operation. Further, in the machine shown in the drawings, the values are entered into the counting mechanism actuating device by means of a plurality of depressible keys, but it is to be understood that other suitable or well-known means may be employed for introducing the values into the device. It is preferable, however, to embody the invention in a keyboard calculating machine wherein the values are introduced into the machine by the depression of keys. The calculating machine shown in the accompanying drawings is of the true rotary type, embodying a rotatable counting mechanism actuator of the reversible cycle type, which is rotated from initial or neutral stop position through a complete cycle in either direction to perform a calculating operation. The actuator is rotated from neutral stop position through one or more complete cycles of 360 degrees in either direction and is stopped at neutral stop position. The counting mechanism is arranged on a carriage, normally stationary with respect to the actuator, and displaceable longitudinally to make direct action of the actuator on the various figure discs of the counting mechanism possible. The actuator is rotated by an electric motor, preferably continuously energized during the use of the machine, a clutch and stop mechanism being interposed between the motor and the actuator, to permit intermittent rotation of the actuator while the motor operates continuously. A reversing gear is interposed between the actuator and the clutch to permit rotation of the actuator in either direction.

Referring to said drawings:—

Figure 4 is a longitudinal vertical section through the machine showing one bank of keys and the elements associated therewith for entering the value to be calculated into the rotatable drum.

Figure 6 is a side elevation of the machine, a portion of the casing being broken away to disclose the actuating keys for performing problems in addition, and subtraction, and the mechanism employed for controlling the duration of operation of the machine for solving problems in multiplication and division.

Figure 7 is a detail side elevation of the mechanism for controlling the duration of operation of the machine, the view being taken from the side of the mechanism opposite to that of which the view in Figure 6 is taken.

Figure 8 is a longitudinal vertical section through the machine showing the keys for predetermining the duration of operation of the machine to perform a calculating operation.

Figure 9 is a cross-section taken on the line 9—9 Figure 8, showing the construction of the first key in the series.

Figure 10 is a cross section taken on the line 10—10, Figure 8, showing a value key, the means for holding the key in the depressed position and the means for releasing the key at the end of the predetermined calculating operation.

Figure 11 is a cross section through the clutch which is interposed between the driving shaft and the rotatable drum.

Figure 14 is a detail of a counter mechanism actuating unit in engagement with the counting mechanism.

Figure 15 is a side elevation of the cam member forming part of an actuating unit.

Figure 1:
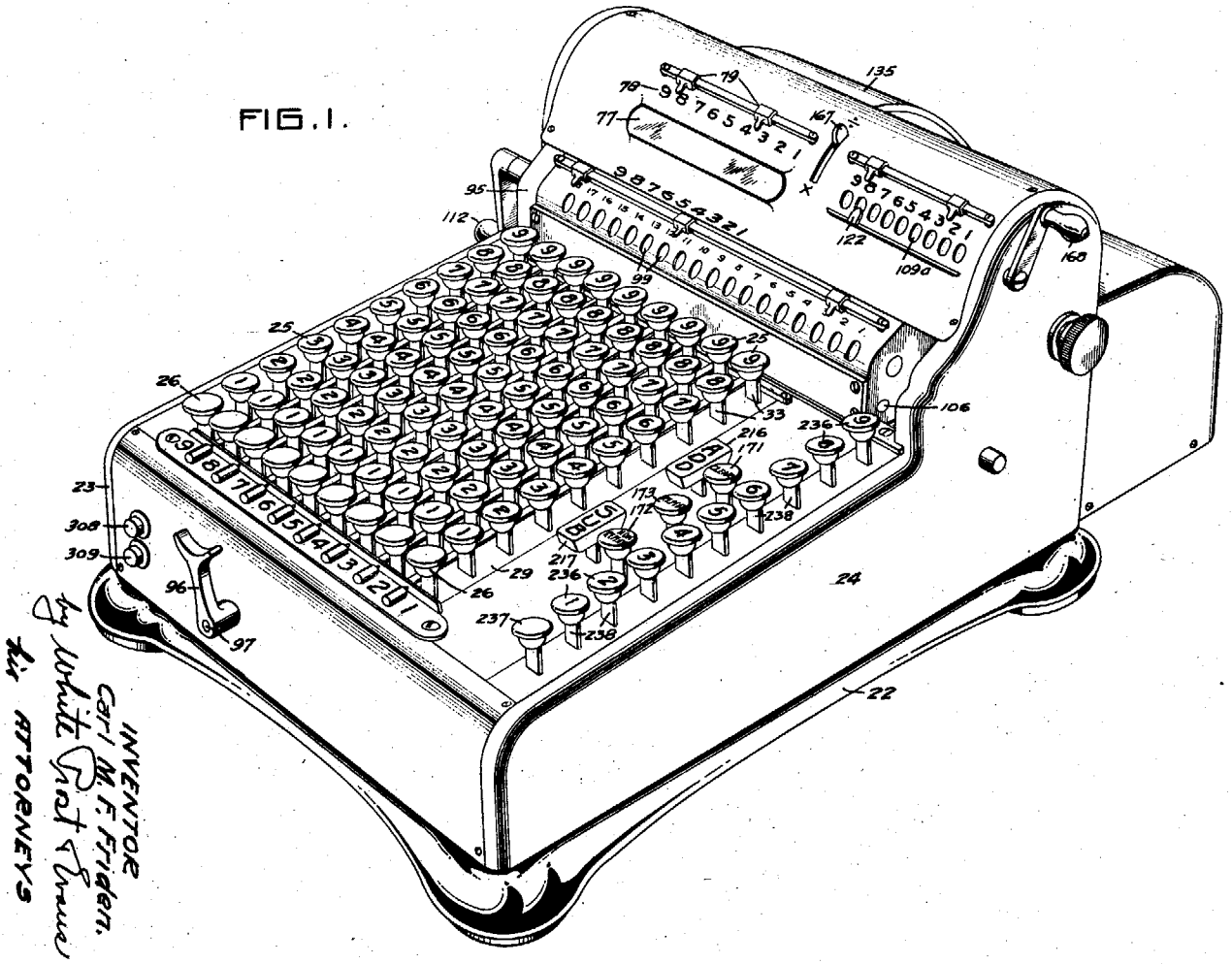
Figure 1 is a perspective view of one type of calculating machine embodying my invention.

The machine shown in the accompanying drawings is of the keyboard type, in which the values are introduced into the machine by the depression of keys. The depression of a key, introduces a value corresponding to the numeral on the key, into a rotatable drum within the machine, rotation of the drum being effected to accomplish the calculating operation. The values introduced into the drum, are transmitted, on rotation of the drum, to the figure discs of a counting mechanism, which, for the purpose of making direct action of the selected values on the figure discs of highest value possible, is disposed in parallel displaceable relation to the value selecting mechanism axis.

One of the objects of the present invention is to provide a calculating machine in which the mental effort of the operator is finished as soon as the factors of the calculation have been entered into the machine. This is particularly advantageous in a power driven calculating machine, although it may also be used to advantage in a hand operated machine. Calculating machines have been constructed in the past in which the mechanism has been operated by power but in such machines it has been necessary for the operator to continue to think and to act to stop the machine at the proper time.

In accordance with the present invention however, it is not necessary for the operator to think, after the factors have been entered into the machine, since the machine will be automatically stopped when the calculation represented by the factors is completed. Thus, the present machine, not only reduces the manual effort necessary to calculation but greatly reduces the mental effort, the only mental effort necessary is that required to insure the proper entry of the factors into the machine.

The calculating machine shown in the drawings, and which embodies the present invention comprises a suitable base 22 having side plates 23—24, between which the selecting, counting and controlling mechanism devices are arranged. These devices include a counting mechanism arranged on a longitudinally displaceable carriage, a counting mechanism actuating drum which, upon rotation, causes the values entered therein, to become effective in operating the counting mechanism, keys for entering the selected values into the drum, keys for determining the duration or extent of rotation of the drum, an indicator for disclosing the values entered into the drum, an indicator for disclosing the calculations performed or being performed and other devices for controlling the actuation of the keys, the selecting mechanism, the counting devices, the control devices and other instrumentalities. The machine contains all of the elements necessary to quickly and accurately perform the operations of addition, subtraction, multiplication and division and these operations are performed automatically by the depression of keys. The machine is provided with a cover plate disposed between the side plates and arranged on the cover plate, and preferably towards the left side thereof, are the banks of keys which form the keyboard for entering values into the drum. In the present illustration, Fig. 1 and Fig. 4, the machine is provided with nine rows of numeral keys 25 each row comprising nine keys numbered from 1 to 9 consecutively and also including, at its forward end, a clearance key 26, depression of which releases the depressed key in the corresponding row. When a key in a row is depressed, it remains depressed until released, either by the operation of a clearance key or by the operation of the calculating mechanism. Extending across the machine, between the side plates 23—24 are fixed cross bars 27 and 28 upon which the key sections are mounted, each section comprising a row of nine keys 25 and one key 26. Each section is formed as a unit and is incorporated in the machine as a unit, and the desired capacity of the machine determines the number of sections to be employed. Each section comprises a top plate or top strip 29, which forms part of the cover plate of the machine. Secured to each top strip, adjacent, but spaced from its ends, is a strap 32 which forms a guiding element for the key shanks 33. The keys are normally held in raised positions by springs 34, bearing against the straps 32 and against the shoulders formed on the key shanks. Disposed below and in contact with the under side of the straps 32 is a slide 35 normally held in forward position by the spring 36. The slide is provided with a plurality of apertures through which the key shanks extend and each key shank is provided with a detent 37, which, when the key is depressed, causes longitudinal movement of the slide 35 and which engages under the slide 35, to hold the key in the depressed position. The clearance key 26 is provided on its face with a projection 38, which operates, on depression of the clearance key, to move the slide to release the depressed key.

The selecting bar or lever which is variably depressed by the depression of the different keys, is positioned below the key stems and comprises a duplex lever. The main lever 41 is pivoted at its forward end to a tongue 42 secured to and depending from the frame and is connected at its free or movable end with a bent lever 46 fulcrumed on the rod 45 and provided on its other end with a curved rack 51 meshing with a gear 52 of the counting mechanism actuating device.

Fulcrumed on a tongue 43 positioned between the ends of the lever 41 and nearer the free end thereof, is a secondary lever 44 which is pivoted by the pin 44A to the main lever 41, the pin being located adjacent the fulcrum on the tongue 43, so that a relatively small angular movement of the pin 44A is produced by a greater angular movement of the lever 44. The lever 44 extends toward the pivoted end of the lever 41 and lies alongside the lever 41. The levers are offset laterally just behind the pin 44A, so that the main portion of the lever 44 is alined with the rear portion of the main lever 41. The stems of the keys are in alinement and in the present construction, the stems of keys representing the values from 1 to 6 inclusive occur directly above the main portion of the lever 44, and the stems of keys representing the values 7 to 9 inclusive occur directly above the rear portion of the lever 41. Thus, keys representing the values 1 to 6 inclusive mediately operate the main lever and keys representing the values 7 to 9 inclusive directly operate the main lever. When the key representing value 4 is depressed, for instance, it depresses lever 44, thus depressing the free end of the lever 41. When the key representing the value 9 is depressed, it directly depresses the free end of the lever 41. By this arrangement, a slight inaccuracy in the length of the key stem or in the amount of movement of a key stem, will not produce any material variation in the setting of the value selecting elements and greater manufacturing tolerances are permissible, thus rendering quantity production possible.

Mounted on the rod 45, disposed at the rear of the machine, are a plurality of levers 46, there being one lever 46 for each key section. Each lever 46 is provided with a horizontal arm connected to the end of the lever 41 and with a vertical arm connected with the value selecting element on the counting mechanism actuating drum. The horizontal arm is provided with a slot 47 which is engaged by a pin 48 on the lever 41 to permit relative movement of the arm and the lever as the lever is depressed by the numeral keys. Depression of the lever through various predetermined distances, causes various angular displacements of the vertical arm 49 of the lever. The vertical arm 49 is provided on its upper end with a rack 51 concentric with the rod 45 which is in engagement with a gear 52 on the value selecting element. Depression of a key in one section thus causes an angular displacement of the selecting element 56 associated with the section, to a position corresponding to the numerical value of the depressed key. There is a selecting element associated with each key section, in the present instance there being nine selecting elements. The lever 41 is normally held in raised position and the vertical arm 49 of the lever in retracted position by a spring 49A connecting an arm 50 on the lever 46 to the base of the machine.

Figure 2:
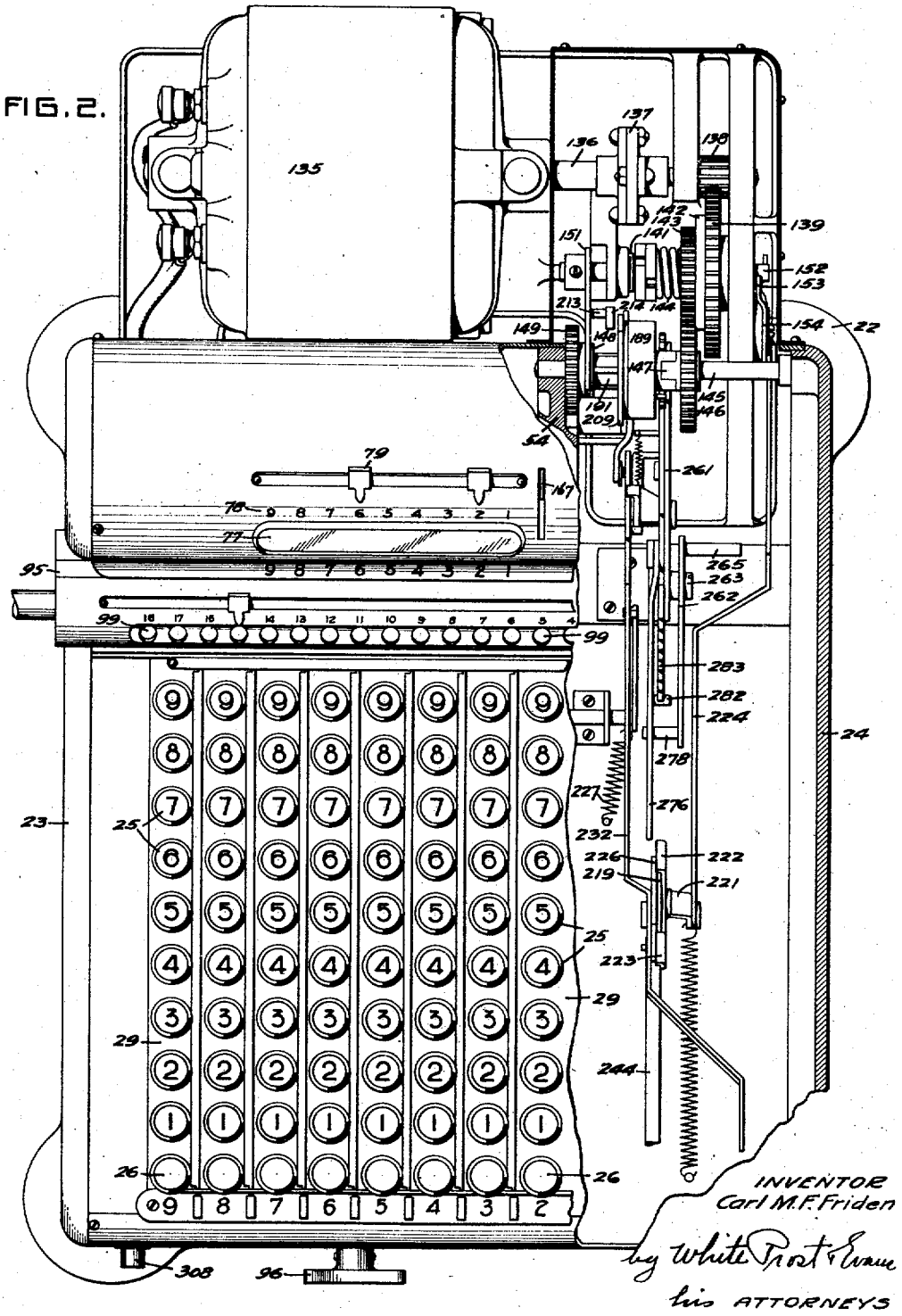
Figure 2 is a top or plan view of the machine shown in Figure 1, a portion of the casing being broken away to show the mechanism which operates to stop the machine after the selected calculating operation has been completed.
Figure 3:
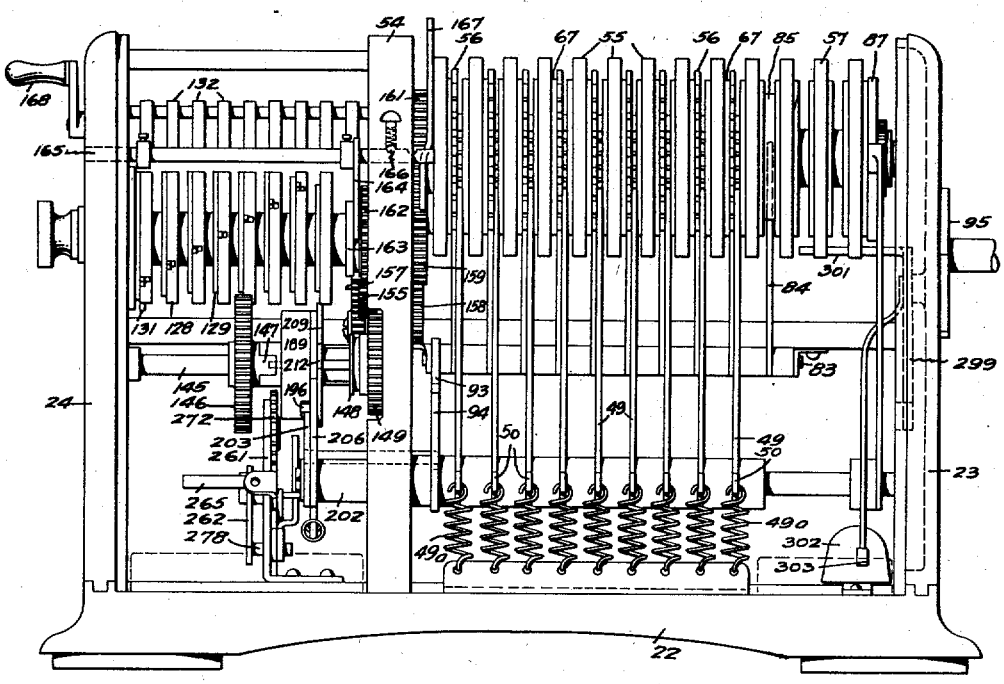
Figure 3 is a rear view of the machine shown in Figure 1 with the casing removed.

The counting mechanism actuating drum is mounted on the shaft 53, supported in the side plate 23 and the intermediate 54, Figure 2. The drum comprises nine counting mechanism actuating wheels 55, Figures 3 and 4, secured to the shaft 53 and nine value selecting elements 56 loose on the shaft, a wheel 55 and an element 56 being combined together to form an actuating unit. The drum also comprises additional wheels 57, Fig. 3, provided with tens carrying pins and selecting element locking means, as will hereafter be described. The drum is rotatable in either direction from an initial position through a complete revolution back to initial position by a driving motor which is connected to the drum through gearing which is capable of being reversed, so that for rotation of the motor in one direction, the drum may be rotated in either direction.

Each actuating unit comprises a counting mechanism actuating wheel and an associated value selecting element. The actuating wheel comprises a disc or wheel carrying a diametrically disposed slide or member 65, Fig. 14, seated in the wheel so that it may be moved diametrically thereof. The slide is provided on one end with an actuating face provided with nine teeth 66, the teeth being arranged on an arc concentric with the wheel and having the same pitch as the teeth of the intermediate wheel of the counting mechanism. The slide is held in the groove in the wheel by a ring 67 secured to the wheel and is normally held in retracted position with the teeth or curved rack 66 lying within the periphery of the wheel. The function of the selecting element is to project or retract the slide, at the proper time during the rotation of the drum, to bring the selected number of teeth into engagement with the counting mechanism. The selecting element 56, to one side of which the gear 52 is secured, is provided on its opposite side, that is, the side which lies adjacent the associated actuating wheel, with a cam 68, Fig. 15, which is engaged by a roller 69 on the slide 65. The cam 68 is provided with a high face 71 and when the roller is in engagement with this face, the slide is held in retracted position, and with a low face 72, and when the roller is in contact with the low face, the slide is in projected position. To insure the positive sliding movement of the slide, a backing cam 73, complementary to the main cam, is arranged opposite the low face 72, thus forming a cam groove 74 through which the roller travels as the wheel is rotated, thus insuring the positive sliding motion of the slide at selected times, during the rotation of the wheel, depending upon the setting of the selecting element. The slide is thus reciprocated for each rotation of the wheel and the time of its reciprocation with respect to the position of the wheel, is determined by the setting of the selecting element. When the drum is rotated in one direction, the slide is projected as the actuating face or rack is passing the intermediate wheel of the counting mechanism, so that the selected number of teeth engage the counting mechanism and is withdrawn after it passes the counting mechanism. When the drum is rotated in the opposite direction, the slide is projected before it reaches the counting mechanism and is withdrawn as soon as the intermediate wheel has moved the selected number of steps. When the selecting element is set at zero, the slide is projected after the actuating face has passed the counting mechanism, when the drum is rotated in one direction and is projected and withdrawn before the actuating face reaches the counting mechanism, when the drum is rotated in the opposite direction. Each of the nine actuating wheels of the drum is provided with a slide 65 having a curved rack 66 on its end and in order that all of the projected racks will not engage the intermediate wheel of the counting mechanism at the same time, during the rotation of the drum, and thus suddenly throw a large load on the driving motor, the slides are spaced apart angularly around the face of the drum.

Means are provided for indicating the values which have been entered into the machine by the depression of the keys, so that it is not necessary for the operator to search over the keyboard to determine the setting of the machine. Each selecting element is provided with a flanged rim section 76, Figure 15, upon which the numerals from zero to 9 are successively delineated and one numeral in each row on the successive selecting elements is visible through a window 77, Figures 1 and 4, in the casing. When a key in a key section is depressed, the numerical value of the key appears in the window in the position occupied by that particular section. Above the window the casing is provided with numerals 78 and with pointers 79 to enable the displayed number to be readily read.

The selecting elements are adjustable to selected positions by depression of the keys but are not rotatable with the drum and means are provided for locking them against rotation upon the movement of the drum from neutral position and for preventing the entering of any values into the drum after it has moved from neutral position. Each selecting element is provided with an arcuate rack 81 and these racks are engageable by fingers 82, Fig. 4, to prevent movement of the selecting element when the drum is out of neutral position. The fingers are mounted on a transverse shaft 83, and are connected together to lock or release all of the selecting elements. Secured to the sleeve to which all of the fingers 82 are secured, is an arm 84, Fig. 12, having a rounded end engaging the cam 85 secured to the drum shaft. The cam is provided with a depression 86 which registers with the end of the arm when the drum is in its neutral position, permitting the fingers to fall by gravity from engagement with the racks 81.

Upon movement of the drum, the cam 85 causes the arm 84 to be moved, raising the fingers into engagement with the rack and holding them in such position during the time that the drum is out of neutral position. The point at which the locking fingers become effective is determined by the length of the depression 86. The values entered into the machine by the depression of the keys can therefore not be altered after the drum has moved a predetermined distance from neutral position. Means are also provided for centering the drum in neutral position at the end of each calculating operation. Secured to the drum shaft is a cam 87 having a deep depression 88, which is engaged by a roller 89 on the end of the lever 91. The lever is suitably pivoted within the machine and the roller is pressed against the cam by the spring 92, the slope of the cam and the tension of the spring being sufficient to cause the lever to center the drum in neutral position at the end of the calculating operation.

The calculating machine may be employed to perform operations of addition, subtraction, multiplication and division, a step in any operation being performed by a rotation of the drum. Means are provided for setting the mechanism to automatically clear the keyboard and drum after each rotation of the drum, when performing problems of addition or subtraction and for causing the values entered on the keyboard to remain unalterable during successive rotations of the drum, when performing the operations of multiplication and division. Secured to the sleeve to which the fingers 82 are secured, is an arm 93, Fig. 12, which is raised when the fingers are moved into contact with the rack. Means are provided for locking this arm in the raised position, when the machine is set to perform operations of multiplication or division so that the setting mechanism will not be released on the rotation of the drum. The means for holding the arm 93 in raised position consists of a lever or abutment 94 which is rocked by movement of the clutch lever 203. The lever 94 is mounted on the clutch lever shaft 202 and is secured to the clutch lever, so that as the clutch lever is rocked in a clockwise direction to cause engagement of the clutch, the lever 94 is moved to engage the raised arm 93 and hold it in such position, thus holding the detents 82 in engagement with the racks 81. Movement of the clutch lever to cause disengagement of the clutch, rocks lever 94 and this removes the stop from below the arm 93, so that the detents are free to fall from engagement with the racks. During the operations of addition and subtraction, the keyboard is automatically cleared at each rotation of the drum but during the operations of multiplication and division, the keyboard is not automatically cleared when the drum moves from neutral position, but is cleared by the use of a clearance key, which will hereafter be described, and which is used after the completion of the multiplying or dividing operation.

The values entered into the drum, are transferred, upon rotation thereof, to the counting mechanism which is arranged on the longitudinally movable carriage 95, which is movable to permit the action of the actuating element on the counting wheels of different value. Any suitable means are provided for moving the carriage longitudinally either in a step-by-step movement or continuously to either end of its range of travel. Usually the carriage is moved in a step-by-step movement by means of a lever 96 arranged at the front of the case and mounted on the shaft 97 which extends backward to the carriage shifting mechanism 98. Any suitable form of carriage shifting mechanism may be employed and I have had successful results with the carriage shifting mechanism shown in my copending application Serial No. 539,422, filed February 27, 1922, to which reference is hereby made for a more complete description of such mechanism. The counting mechanism comprises a plurality of figure discs 101, Fig. 14, arranged in axial alinement in the longitudinally displaceable carriage. The figure discs are mounted on a shaft and have figures on their faces which are visible through apertures 99 in the carriage casing. Each disc is provided on one side with a toothed wheel 102, secured thereto, and meshing with an intermediate toothed wheel 103 loosely mounted on the shaft 104. Upon rotation of the drum, the toothed faces of the actuating element move into engagement with the intermediate wheels, causing rotation thereof and consequently rotation of the figure discs. The figure discs are prevented from over-throwing and are caused to move with a step-by-step movement by the escapement latches 105, Fig. 4, pivoted on the shaft 106. These latches are held in latching engagement with the toothed wheels of the counting discs by spring pressed balls 108, carried by the bar 109. The bar is rotatable to move the balls out of engagement with the latches and thus free the latches, when it is desirable to reset the figure discs to zero. Suitable or well-known means may be employed for rotating the figure discs to zero, by the rotation of the shaft on which the discs are mounted, which is provided externally of the carriage with a crank 112. Suitable means are provided such as is disclosed in my prior application heretofore identified for causing the release of the latches on the initial movement of the crank 112 so that the number discs may be readily returned to zero position. The counting mechanism is also provided with suitable transfer levers 113 which operate in conjunction with laterally movable tens-carrying pins on the drum, to carry over values from one counting disc to the counting disc of next higher denomination. Transfer levers and tens-carrying pins of the type shown in my copending application may be used in the machine shown in the present application and these devices are well known in the calculating machine art so that it is not necessary herein to describe their construction or mode of operation.

The machine is provided with means for indicating the third factor of the calculation. One factor is indicated by the depression of the value keys of the keyboard, the other factor is indicated on the counting mechanism on the carriage and the third factor is indicated independently of the first two. For instance, in the operation of multiplication, the multiplicand is shown at the window 77, the product is shown on the carriage and the multiplier is shown at the window 109[a]. This third factor is entered into the machine by the rotation of the drum, which is rotatable in either direction as has been set forth hereinbefore. The third factor indicating mechanism is mounted between the side plate 24 and the intermediate plate 54 and comprises a counting mechanism consisting of a plurality of numeral wheels 114, Fig. 8, each provided on its side with a toothed wheel 115 and meshing with intermediate toothed wheels 116. The counting wheels are movable with a step-by-step motion controlled by the spring pressed detents 117. The selected intermediate wheel 116 is rotated one tooth for each revolution of the drum by the tooth 118 splined to the shaft 119. The tooth 118 is movable longitudinally of the shaft 119 into the plane of the intermediate wheel of the selected denomination by the longitudinal movement of the carriage, so that the values entered into the third factor are of the same denomination as the values entered into the second factor or product. Surrounding the shaft 119 is a collar 120 to which the toothed member 118 is connected and this collar carries an indicator 122, Figures 1 and 8, which indicates the denomination of the numeral being entered into the third factor. Secured to the collar 120 is a rod 123 which is connected to the carriage as shown in my copending application so that the indicator 122 moves in time with and in the opposite direction to the carriage. The shaft 119 is rotated by and in time with the rotation of the drum. Rotatably mounted adjacent the numeral wheels 114 is a tens-carrying drum 128, this drum being provided with cams 129 and spring pressed pins 131 which cooperate with the transfer levers 132 of the counting mechanism to carry tens to the counting wheels of next higher denomination. Means are provided for causing the tens-carrying drum 128 to rotate in either direction for one direction of rotation of the value drum, in order to permit the third factor register to be used in connection with problems in both multiplication and division.

The drum is driven by an electric motor 135 which is preferably mounted on the base of the machine at the rear portion thereof. The motor shaft 136 is suitably journalled in the frame of the machine and is provided with a flexible coupling 137 to reduce the vibration which may be transferred from the motor to the mechanism and also to take care of any lack of accurate mounting of the motor shaft. Secured to the motor shaft is a pinion 138, Fig. 2, which meshes with a gear 139 mounted on the hollow countershaft 141. A friction clutch is interposed between the gear 139 and the calculating machine mechanism, so that in the event of a jamming of the calculating mechanism, the clutch will slip and thereby prevent destruction of the mechanism. Mounted on the shaft 141 in contact with the gear 139 is a friction disc 142 and on the other side of the friction disc is a gear 143. The gears 139 and 143 and the friction disc 142 are pressed into tight frictional contact by the coiled spring 144 surrounding the hollow shaft 141. The gears 139 and 143 are thus frictionally connected so that normally power is transmitted from gear 139 to gear 143, but in the event that gear 143 is held stationary, gear 139 may rotate, due to the frictional connection. Journalled in the casing and arranged parallel to the countershaft 141 is a driving shaft 145 to which is secured a gear 146 which meshes with the gear 143 on the countershaft. The shaft 145 is provided, between the gear 146 and the calculating mechanism with a clutch 147 which controls the duration of operation of the calculating mechanism. The clutch will be described hereinafter.

Splined on the shaft 191 is a collar 148 to which is fixed a gear 149 which gear drives the calculating mechanism. See Figures 3, 5, 8, and 16. The gear 149 is movable longitudinally of the shaft 191 to two different positions to accomplish the reversal of the direction of rotation of the drum with respect to the direction of rotation of the motor. When the machine is being used, the motor is in continuous operation, rotating in one direction, and since it is essential, in performing the different problems in calculation to rotate the drum in opposite directions, a reversing gear is inserted for this purpose and the shifting of the gear 149 accomplishes this reversal.

The gear 149 is shifted longitudinally of the shaft 191 by the arm 151 which engages the collar 148. The arm 151 is secured to the rod 152 which extends through the hollow shaft 141. At its end, the rod 152 is provided with a slot in which is disposed the warped or bent arm 153, Fig. 8, of the lever 154 and by shifting the lever 154, the rod 152 is moved lengthwise to shift the gear 149. The mechanism employed for shifting the lever 154 will be described hereafter.

Figure 16:
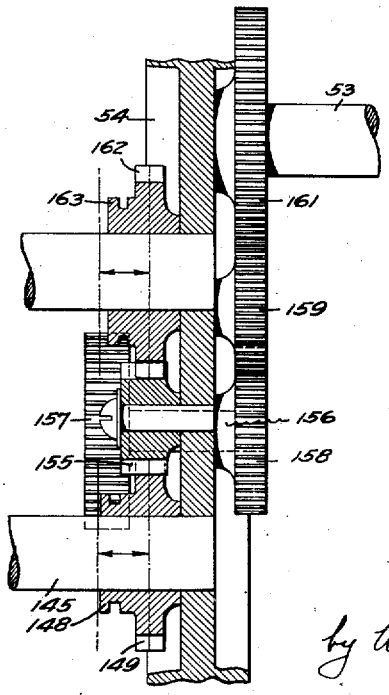
Figure 16 is a detail of the reversing gear mechanism, the view being a section taken on the line 16—16 Figure 8.

Journalled on a shaft mounted in the intermediate wall 54 is a pinion 155, Figs. 3 and 16, which engages the gear 149 when such gear is in one of its positions. Secured to a shaft 156 journalled in the intermediate wall 54 is a gear 157 which engages the gear 149 when said latter gear is in its other position. The gears 155 and 157 are in mesh with each other so that they always rotate in opposite directions. When the gear 157 is in mesh with the gear 149, such gear 157 rotates in the opposite direction to gear 149. When the gear 157 is out of mesh with gear 149 and gear 155 is in mesh with gear 149, then gear 157 rotates in the same direction as gear 149. Therefore the direction of rotation of gear 157 is reversed by shifting the gear 149. Secured to the shaft 156 and lying on the opposite side of the intermediate wall is a gear 158 which meshes with a gear 159 journalled on a shaft mounted in the intermediate wall and the gear 159 meshes with the gear 161 which is secured to the drum shaft. Therefore by shifting the gear 149, the direction of rotation of the drum is reversed. The gears 157, 159 and 161 are of the same diameter and the gear 161 is of the same diameter as the gear 157 so that the drum rotates at the same speed as the gear 157.

Splined to the shaft of the tens-carrying drum 128 and lying on the same side of the intermediate wall as the gear 157, is a gear 162 which is of the same diameter as the gear 157. The gear 162 is secured to or integral with a collar 163 which is also slidable on the shaft of the tens-carrying drum 128 so that the gear 162 is movable longitudinally of the shaft into engagement with either the gear 157 or the pinion 155. When the gear 162 is in mesh with the gear 157, these two gears rotate in opposite direction and when the gear 162 is in mesh with the pinion 155, and out of mesh with the gear 157, the gear 157 and the gear 162 rotate in the same direction. Thus, regardless of the direction of rotation of the calculating drum, the gear 162 may rotate in the same direction or in the opposite direction, thus causing the tens-carrying drum 128, Fig. 3, to rotate in the same or opposite direction. The collar 163 is shifted longitudinally of the shaft by an arm 164 secured to the slidable rod 165 which is held in either of its two positions by the spring pressed ball 166. The rod 165 is provided in its end with a slot which is engaged by the bent or warped end of the lever 167 which projects through an aperture in the casing, Figures 1 and 8, so that by moving the lever 167, the gear 162 is shifted into engagement with either the gear 157 or the pinion 155, depending upon the desired direction of rotation of the tens-carrying drum 128. In performing problems in division it is essential that the tens-carrying drum 128 rotate in a direction to show increasing values on the register 114, whereas the main actuator comprising the element 56, must rotate in a reverse or subtraction direction. It is therefore necessary to provide means for reversing the direction of rotation of the tens-carrying drum 128 with respect to the actuator comprising the element 56. The tens carrying drum 128 and the actuating finger 118 may therefore be rotated in the same or the opposite direction to the actuator depending upon the position of the lever 167. When these elements are set to rotate in one direction, the register 114 will show the number of rotations of the actuator and when set to rotate in the opposite direction, the register will show the complement of the number of rotations of the actuator. This feature of the machine, that is, the ability to show the true number or its complement, is of great advantage in solving certain arithmetical problems, for instance, when it is desired to ascertain the number of monthly payments of a fixed amount which must be made to liquidate the purchase price of an article plus interest. For instance, the purchase is for $500.00 bearing interest at eight percent per annum and payable at the rate of $35.00 per month. It is desired to know how many payments must be made, what amount of each payment is principal and what amount of each payment is interest, what is the amount of last payment, what will be the total interest collected, etc.

By virtue of the provision of the tens-carrying mechanism 128, associated with the counting wheels 114, Fig. 8, it is possible to perform many calculating operations with a much less number of operations of the motor or calculating drum, than has heretofore been possible. The third factor counter 114 is also advantageously used in determining multiplier complements, square roots and in problems in division. The counting wheels 114 are readily reset to zero by rotation of the crank 168 secured to the shaft on which the counting wheels are mounted. Any suitable means, such as is shown in my prior application above identified, may be employed for releasing the latch 117 to permit the counting wheels 114 to be readily reset to zero position.

Figure 5:
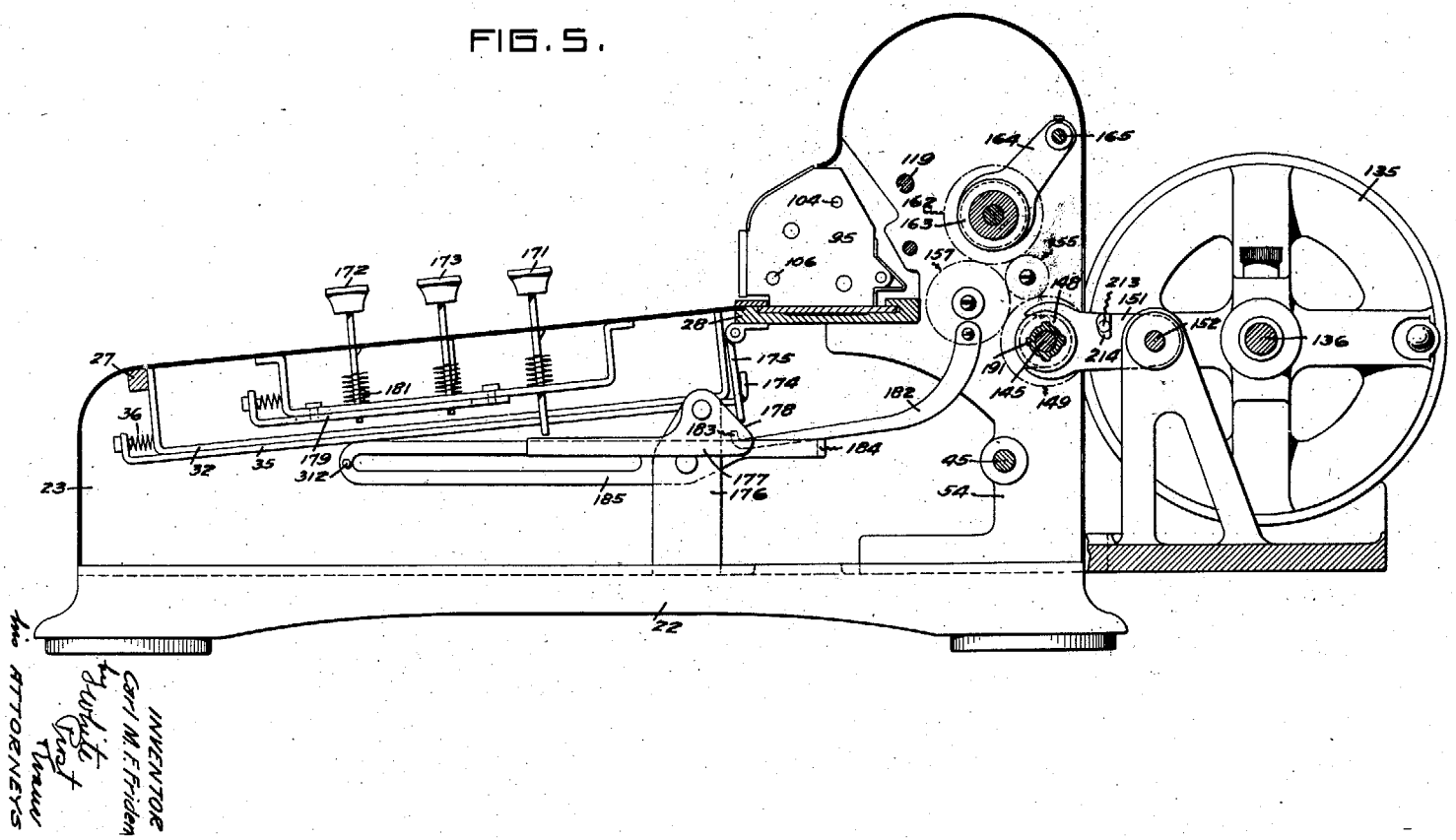
Figure 5 is a longitudinal vertical section through the machine showing the control keys and the operating mechanism associated therewith for controlling the release of the keys for entering the values into the drum.

Means are provided for clearing the keyboard and for setting the machine to perform problems in addition and subtraction, the machine being normally set to perform problems in multiplication and division. Arranged on the keyboard are three keys, Figures 1 and 5, one key 171 marked "Clear", depression of which clears all inserted values from the keyboard; another key 172 marked "Non-repeat", which, when depressed, sets the machine for operations of addition and subtraction, and another key 173, marked "Repeat", depression of which releases key 172 and restores the machine to condition for operations of multiplication and division. The slides 35, which serve to hold the depressed numeral keys in depressed position, are normally held forward by springs 36 and are provided on their rear ends with lips 174, Fig. 4. Pivoted to the frame of the machine, and disposed in front of the lips 174 of the plurality of slides 35, is a gate or plate 175, which when pushed backward, moves the slides 35 backward and thus causes the release of the key-shanks. Pivoted within the casing on a post 176, Fig. 5, is a lever 177, one end of which is disposed below the shank of the key 171. The other end of the lever is provided with a cam face 178 which lies adjacent the lower end of the gate 175, so that depression of the key 171 rocks the gate 175 thus moving the slides 35 to release all of the depressed numeral keys.

The devices set into operation by the depression of the key 172, which is held in depressed position by the spring pressed slide 179 engaging the projection 181 on the shank of the key, comprise a tripper bar 182 pivoted to the gear 157 so that its free end is reciprocated as the gear is rotated. This gear is directly connected to the calculating mechanism operating drum and rotates synchronously therewith. At its free end, the bar 182 is provided with a projection 183 which reciprocates back and forth below the gate 175 and normally out of contact with the gate. The bar is supported intermediate its ends and slides on a lateral projection 184 on the lever 185, pivoted intermediate its ends to the post 176. The front end of the lever 185 lies below the shank of the key 172 so that when said key is depressed, the projection 184 is raised, raising the free end of the bar 182 so that the projection engages and swings the gate 175, at each rotation of the gear 157. The depressed numeral keys are thus released during the rotation of the drum. Depression of the key 172 therefore causes the depressed keys of the keyboard to be released during the rotation of the drum and depression of the key 173 releases depressed key 172 and consequently renders the releasing mechanism inoperative so that the keys of the keyboard remain depressed during repeated rotations of the drum. These keys may be released by depression of the clearance key 171. The key 173 cannot be locked in depressed position and its function is to release key 172.

The keys 172 and 173 may be designated as control keys since the depression of these keys determine the control of the keyboard during the calculating operation.

Figures 12, 13:
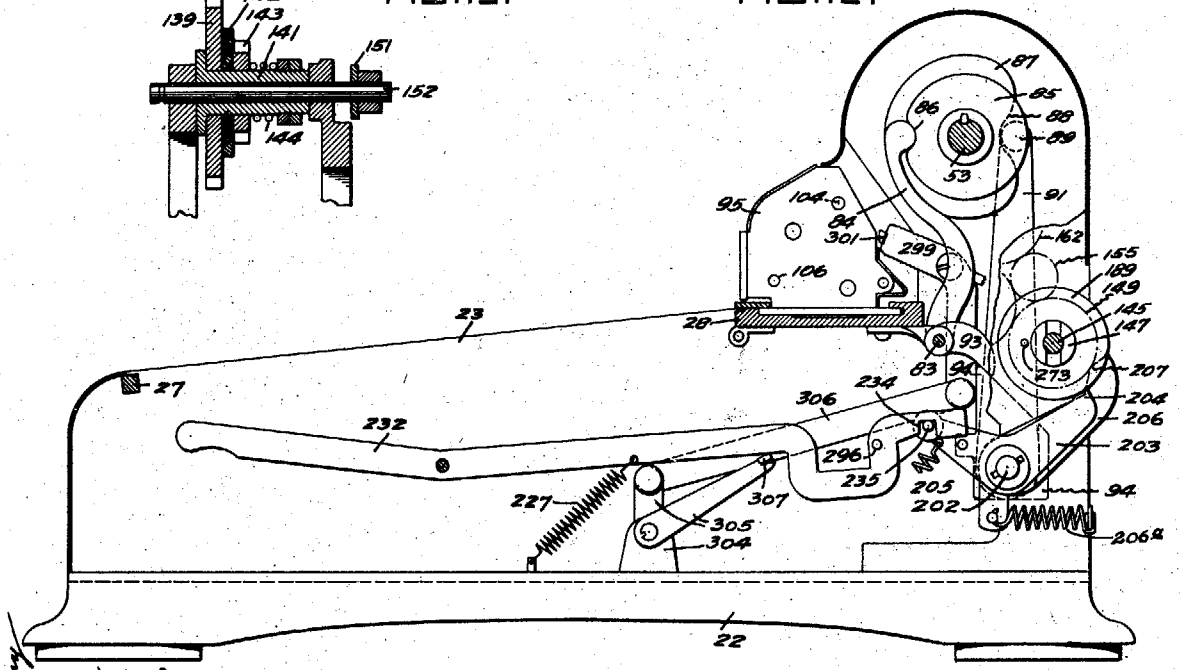
Figure 12 is a cross-section through the machine showing the means for engaging and disengaging the clutch and for centering the drum in neutral position.
Figure 13 is a longitudinal section through the countershaft, showing the friction clutch.

Interposed between the driving shaft 145 and the driving gear 149, is a normally disengaged clutch 147, Figs. 2 and 12, the normal disengagement of this clutch permitting the motor to run continuously without causing rotation of the driving gear 149. The clutch comprises a ratchet wheel 188, Fig. 11, secured to the shaft 145 and a surrounding housing 189 secured to the shaft 191 on which the collar 148 is splined. The shaft 191 is in axial alinement with the shaft 145.

Pivoted in the housing 189 is a pawl 192 having a tooth 193 adapted to be moved into engagement with the ratchet 188 by the spring 194. The tooth 193 is normally held out of engagement with the ratchet so that the ratchet is free to rotate without causing rotation of the housing. The housing 189 is provided with an aperture 195 through which an ear 196 of the pawl 192 extends. By pressing the ear 196 inward, the tooth 193 is moved from engagement with the ratchet 188 and means are provided for normally holding the ear pressed inward so that the pawl is out of engagement with the ratchet. When the means holding the ear 196 depressed, is removed, the pawl drops into engagement with the ratchet and remains in engagement until the ear 196 is again depressed.

Means are provided for permitting the engagement and causing the disengagement of the clutch, for centering the housing in neutral position at the disengagement of the clutch and for preventing improper operation of the clutch. Pivoted in the casing on the shaft 202, Fig. 12, disposed below the clutch, is a lever 203 having a projection 204 on its end which is adapted to engage the ear 196 of the pawl and disengage the pawl from the ratchet. The lever 203 is normally held in position with the projection 204 in contact with the face of the housing 189 by a spring 205 connected to the other end of the lever. As the clutch rotates the projection 204 engages the ear 196 and causes disengagement of the clutch. The clutch is thereby stopped and locked against cyclic movement after disengagement.

The clutch is also adapted to be resiliently centralized by a common form of centralizer comprising a centralizing lever 206 freely supported independently of lever 203 on shaft 202 and having a cam shaped end 207 adapted to seat in a similarly shaped depression 208 in the face of the housing. The lever 206 is maintained in contact with the face of the said housing at all times by a spring 206a tensioned between a depending lug on the lever and a portion of the frame.

Means are provided for preventing the shifting of the gear 149 except when the clutch is in neutral position and for preventing rotation of the clutch during the time that the gear is being shifted. Secured to the clutch housing is a disc 209, Fig. 11, which projects outward beyond the housing and which is provided, beyond the periphery of the housing, with an aperture or indentation 212. Secured to the arm 151, Fig. 2, which shifts the gear 149, is a projection 213 having a head 214 of substantially the same shape as the aperture 212. When the housing 189 is in neutral position, the aperture 212 is alined with the head 214 so that the head may be moved through the aperture. When the housing is not in neutral position, the aperture is not alined with the head and consequently the head may not be moved through the opening, thereby preventing the gear 149 from being shifted. Similarly, during the time that the head 214 is moving through the aperture 212, the housing 189 may not rotate, due to the presence of the head in the aperture. The means for shifting the gear 149 and the means for releasing the clutch, are operated by the same instrumentalities and by providing the head 214, the clutch is prevented from rotating before the gear has completed its shift. In the shifting of the gear, the head moves entirely through the aperture in the disc 209 and prevents rotation of the disc as it is moving through the aperture.

Arranged on the keyboard are two actuating keys 216—217, Fig. 6, the key 216 being designated as the addition key and the key 217 being designated as the subtraction key. Depression of the key 216 causes engagement of the clutch and rotation of the calculating drum for one rotation in one direction and then causes disengagement of the clutch. The depression of the key 217 produces the same results, with the difference that the drum is rotated in the opposite direction. When the keys are alternately depressed, the depression of a key also serves to shift the gear 149 but when one key is depressed a plurality of times, the gear is not shifted. It is understood that depression of the key 216 positions the gear 149 in one position and depression of the key 217 positions the gear 149 in the other position. The keys 216 and 217 are normally held in their raised position by springs 218 and, preferably, the keys are not provided with means for holding them in the depressed position. Disposed below the keys 216 and 217 is a bracket 219 to which the T-shaped lever 221 is pivoted adjacent its upper end. One arm 222 of the T-shaped lever lies under the shank of the key 216 and the other arm 223 of the T-shaped lever lies under the stem of the key 217. Depression of the key 216 rocks the lever 221 to the position shown in Figure 6 and depression of the key 217 rocks the lever 221 to its opposite position. Connected to the lower end of the lever 221 is a rod or link 224 which is connected at its other end to the lever 154 which operates to shift the shaft 152. See also Figure 8. Depression of the keys 216 and 217 therefore serve to shift the shaft 152 and thus shift the gear 149 to accomplish reverse rotation of the counting mechanism actuating drum.

Means are also provided for causing the depression of either key 216 or 217 to cause engagement of the clutch. Pivoted to the bracket 219 adjacent the bottom thereof is a plate 226 which is rocked backward by the depression of a key, the plate being normally held in its forward position by the spring 227, Figures 2 and 12. The plate is provided, below the shank of the key 216 with a flat surface 228 which is engaged by the shank of the key to cause the plate to rotate about its pivot 229. Below the shank of the key 217 the plate 226 is provided with an inclined face 231 which, when it is engaged by the shank of the key, causes the plate to rock backward. The plate is therefore rocked backward by the depression of either key and the backward movement of the plate operates through suitable instrumentalities, to cause engagement of the clutch. Fulcrumed on the plate 226 adjacent its upper end, is a lever 232 which rests at one end on the spring held plate 253 and which is provided at its other end with a notch 234, Fig. 12, in which the pin 235 of the lever 203 is normally disposed. Backward movement of the lever 232 will therefore rock the lever 203 about its pivot 202 against the tension of the spring 205 and this movement of the lever 203 withdraws the projection 204 from contact with the ear 196 thereby permitting engagement of the clutch and rotation of the clutch housing. In accordance with the mechanism so far described, the clutch will remain in engagement as long as either of the keys 216 or 217 is held depressed and as soon as pressure is released from the keys, the spring 227, Fig. 6, will pull the lever 232 backward and cause the projection 204 on the lever 203 to disengage the clutch and permit the lever 206 to stop rotation of the housing in neutral position. Ordinarily, however, the keys 216 and 217 are used only to perform problems in addition and subtraction and are not held down to accomplish problems in multiplication or division. A quick depression and release of either of the keys will result in the disengagement of the clutch after one rotation of the counting mechanism actuating drum, but means have been provided, as will be set forth hereinafter whereby when the control key 172 is depressed, depression of either of the keys 216 or 217 will result only in one cycle of operation of the machine, regardless of the duration of time during which these keys 216 or 217 are held depressed. In other words, the machine may be operated to cause continuous rotation of the counting mechanism actuating drum as long as the actuating key is held depressed or may be operated to disengage the clutch after one cycle of operation of the drum, regardless of whether or not the key is held depressed. With the control keys set so that the counting mechanism continues in operation as long as either of the actuating keys is held depressed, the machine thus far described may be used in calculating problems in multiplication and division but such calculation requires mental effort on the part of the operator to count the rotations of the drum and to release the actuating key when the desired number of rotations have occurred. The machine, however, embodies means which are thrown into actuation by the depression of other value keys to cause the drum to rotate a number of times corresponding to the value of the depressed key and then cause the machine to function to disengage the clutch so that the mental effort of the operator is completed by the depression of the value key.

Arranged on the keyboard is another set of value keys 236, Figure 1 and Fig. 8, including nine keys numbered from 1 to 9 successively and a clearance key 237 adapted to release any of the depressed keys 236 for the purpose of correcting an error in the setting or for other purposes. With the motor in operation, the depression of any one of the keys 236 will cause the counting mechanism actuating drum to be rotated a number of times corresponding to the value of the depressed key. That is, depression of the key marked "3" will cause rotation of the drum three times and depression of the key marked "8" will cause rotation of the drum eight times. At the end of the duration of rotation indicated by the numeral on the key, the clutch is disengaged and locked in neutral position. The shanks 238 of the keys 236 are normally held in raised position by springs 239 and each shank is provided with a cam-shaped projection 241, which, when the key is depressed, causes longitudinal movement of the slide bar 242. The key shanks extend through apertures in the slide bar 242 so that depression of a key causes a sliding movement of the bar. Means are provided for normally holding the slide bar 242 in retracted position and for returning it to such position after the release of the depressed key. The depression of a key 236 sets devices in position to determine the duration of operation of the drum. The engagement of the clutch and the consequent operation of the machine may be caused by the depression of either of the keys 216 or 217, but I prefer to connect the series of keys 236 with the clutch operating mechanism so that depression of one of the keys 236 will not only set in position the devices which limit the duration of operation of the drum but will also actuate the devices which cause engagement of the clutch. With such arrangement, it is then only necessary to depress one of the keys 236 to accomplish multiplication by the number on the depressed key. The keys 236 may be connected with the clutch control mechanism by connecting the slide bar 242 with the rocking plate 226, Figure 6, so that when any key 236 is depressed, the plate 226 is rocked to cause engagement of the clutch. Secured to the end of the slide bar 242 is a bracket 243 which is connected to the plate 226 by the rod 244. The spring 227, see Figure 12, serves to hold the slide bar 242 in retracted position. When a key 236 is depressed, the slide bar 242 is moved forward and consequently the plate 226 is rocked to move the lever 232 to cause engagement of the clutch.

Means are provided for holding the depressed key 236 in depressed position and for releasing the depressed key after the drum has rotated a number of times corresponding to the value of the depressed key. When the key is released, the wedge 241, Fig. 10, moves from contact with the slide bar 242 and permits the slide bar to be retracted, such retracting movement being accompanied by a forward movement of the rocking plate 226, Fig. 6, to neutral position. Each key shank 238 is provided in its side with a notch 245, Fig. 10, which, when the key is depressed, is adapted to be engaged by the latching plate 246. The latching plate 246 extends longitudinally alongside the bank of keys 236 and is pivoted at its end on screws 247 set in the frame 248 through which the key shanks 238 extend. By rocking the plate 246 about its pivot, the plate is withdrawn from the notch in the depressed key and the key permitted to rise. The key 237, Fig. 9, is provided on its side with a cam face 249 which is engaged by the plate 246 and when the key 237 is depressed, this cam face causes the plate 246 to be rocked sufficiently to remove it from the notch of the depressed key. The plate 246 is held in contact with the sides of the key shanks 238 by a spring 252 which exerts an upward pull on the ear 253 which constitutes a lateral extension from the lower portion of the plate 246. The plate is therefore spring pressed against the sides of the shanks of the key.

The forward end of the lever 232, Fig. 6, rests on the ear 253 and when, by the operation of the limit determining means, the rear end of the lever 232 is raised, the front end of such lever depresses the ear 253, rocking the plate 246 about its pivot and releasing the depressed key. When the released key moves upward, the slide 242 is retracted and consequently the rocking plate 226 is moved forward to normal position by the spring 227. It is the rocking movement of the lever 232 about its pivot on the rocking plate 226 that causes the movement of the plate 246 to release the depressed key. Below the notch 245, each key shank is provided with a depression having a slightly inclined upper wall so that after the key has been released the rocking plates 246 may be moved backward by the spring 252 to neutral position.

I shall now describe the means employed in the machine shown in the drawings for limiting the number of rotations of the counting mechanism actuating drum to the value appearing on the depressed key 236. This mechanism operates to cause disengagement of the clutch and stopping of the drum when the drum has rotated a number of times corresponding to the value of the depressed key. Associated with the shanks of the keys 236, Fig. 8, and disposed below such shanks is a duplex lever consisting of the main lever 255 pivoted at its forward end to the ear 256 which is disposed adjacent the front of the machine. Pivoted to an ear 257, preferably arranged adjacent the shank of the eight value key, is a secondary lever 258 which, intermediate its ends, is pivoted to the main lever 255. The auxiliary lever 258 lies below and is adapted to be engaged by the shanks of the keys 236 representing the values from 1 to 6 inclusive so that depression of any of these keys causes downward movement of the auxiliary lever and corresponding movement of the main lever 255. The ends of the key shanks are spaced for different distances from the lever 258 so that the lever is moved for different amounts by the depression of the different keys. The lever 255 is offset adjacent its rear end so that the rear end of such lever lies directly below and is adapted to be engaged by the shanks of the keys 236 representing the values 7, 8 and 9. Depression of either of these keys causes movement of the lever 255 and the keys are so proportioned that the rear end of the lever 255 is moved a distance corresponding to the value of the depressed key. The advantages derived by the use of a duplex lever have been set forth hereinbefore in connection with the duplex levers used with the keys for entering values into the machine. The movement of the rear end of the lever 255 is employed to position a trip actuating device which is variably positioned, in accordance with the value of the depressed key, and which operates to move the trip to cause disengagement of the clutch after the drum has rotated a number of times corresponding to the value of the depressed key.

Arranged adjacent the rear portion of the machine is a frame 261, Fig. 6, which is secured to the base of the machine. Pivoted to the frame 261 adjacent its forward end is a lever 262 which is moved about its fulcrum by the lever 255. The lever 262 is fulcrumed intermediate its ends on the screw 263 seated in the frame 261 and the lever 255 is provided at its rear end with a slot 264 in which is disposed a pin 265 which projects from the rear portion of the lever 262. The depression of a key 236 causes downward movement of the rear end of the lever 255 and consequently downward movement of the pin 265 which results in upward movement of the forward portion of the lever 262. This lever is normally held with its forward portion depressed by the spring 266. The position of the forward end of the lever 262 is determined by the value of the depressed key 236.

Slidably mounted in the frame 261 is a rack bar 267, Fig. 7, which is guided at its forward end by the headed pin 268 which extends through the slot 269 in the frame 261. This slot 269 preferably inclines upward slightly towards the rear of the frame. At its rear end, the rack bar 267 is guided by the roller 271. Mounted in the frame 261 above and in mesh with the rack bar 267 is a pinion 272 which is rotated in a step-by-step movement to cause step-by-step movement of the rack bar 267. Extending from the side of the clutch housing 189, is a pin 273, Fig. 6, which is adapted to engage the pinion 272 and move such pinion one step for each rotation of the clutch housing. The rack bar 267 is therefore moved one step backward for each rotation of the clutch housing. Pivoted to the frame 261 above the rack bar 267 is a latch 274 which may be held in contact with the teeth of the rack bar 267 by gravity or by the spring 275. The latch and the rack bar are constructed to permit a step-by-step backward movement of the rack bar and to hold the rack bar in its backward position. Means are provided for releasing the latch to permit the rack bar to return to neutral position, when the drum has rotated a number of times corresponding to the value of the depressed key.

Pivoted to the pin 268 which is secured to the rack bar is an arm 276 which is provided with an elongated slot 277 in which is disposed the pin 278 which projects laterally from the forward end of the lever 262. The arm 276 is thus positioned in variable angular positions, due to the depression of the various value keys 236. The arm 276 is provided with an ear 281 having a laterally extending pin 282 which operates to contact with and move the tripping mechanism at substantially the end of the last rotation of the counting mechanism actuating drum as determined by the value of the depressed key 236. The pin 282 is variably positioned by the depression of the various keys 236 and the movement of this pin serves to actuate the tripping mechanism for stopping the operation of the machine.

Arranged in cooperative relation with the pin 282 is a stepped plate 283 which has a limited longitudinal sliding movement on the pins 284 and 285 secured to the frame 261. The plate 283 is normally held in its forward position by the spring 286 connected at one end to the pin 284 secured to the frame and at the other end to the pin 287 secured to the plate. The forward edge of the plate 283 is provided with a series of vertical steps 288, the successive steps being set backward a distance equal to the length of one step of movement of the rack bar 267. The front edge of the plate 283 lies in the vertical plane of the pin 282, so that as the pin 282 is moved backward by the backward movement of the rack bar 267, the pin contacts with the vertical face of one of the steps 288, depending upon the angular position of the arm 276 on which the pin is carried. The steps 288 are so arranged that the pin 282 is moved into contact or approximate contact with the vertical face of the step when the machine has completed one less than the predetermined number of operations so that the final operation or rotation of the drum will cause the pin to move the plate 283 backward. When the key 236 representing the value "1" is depressed, the pin 282 is moved to position in front and substantially in contact with the face of the first step 288A so that the first rotation of the drum will cause the movement of the side plate 283 and the release of the clutch.

Means are provided for causing the movement of the slide plate 283 to release the clutch and return the various parts of the mechanism to neutral position. Pivoted to the pin 287, Fig. 7, which is carried by the slide plate is a lever 291 which is rocked by the backward movement of the slide plate. Secured to the frame 261 is an abutment 292 which contacts with the rear face of the lever 291 at substantially the central portion of the lever. As the pin 287 is moved backward, the upper portion of the lever 291 is moved forward, due to the abutment 292 and this forward movement of the upper portion of the lever is employed to cause the release of the clutch and the release of the rack bar 267 and the setting mechanism. The lever 291 is provided on its upper end with an ear 293 which lies in back of and adjacent an ear 294 on the latch 274. As the upper end of the lever 291 is moved forward, the ear 293 engages the ear 294, rocking the latch 274 about its pivot and releasing the rack bar 267. The rack bar is then returned to neutral position by the spring 295 connecting the rear end of the rack bar with the frame 261.

The rear portion of the lever 232, Fig. 6, lies alongside of the upper portion of the lever 291 and the lever 232 is provided with a laterally extending pin 296 which lies adjacent to the cam face 297 of the lever 291. As the lever 291 is rocked, due to the backward movement of the stepped plate 283, the cam face 297 slides under the pin 296 raising the rear end of the lever 232 and raising the lever from engagement with the pin 235 on the end of the clutch control lever. The spring 205, Figure 12, abruptly moves the clutch control lever to cause disengagement of the clutch and the lever 206 causes the positioning of the clutch in neutral position. The upward movement of the rear end of the lever 232 by the pin 296, causes downward movement of the front end of the lever 232 causing the latch plate 246 to be rocked to release the key stems 238. The upward movement of the key stems releases the slide plate 242 and permits the spring 227 to move the rock plate 226 back to neutral position. The release of the depressed key 236 releases the lever 255 and permits the spring 266 to return the lever 262 to neutral position and consequently return the lever 276 to neutral position. These various actions occur substantially simultaneously so that as soon as the slide plate 283 is moved by the pin 282, the machine is stopped and all parts thereof returned to neutral position. When the machine is employed to perform problems in addition, subtraction or division, or when it is used to perform problems in multiplication by the use of the plus key 216, the non-repeat key 172 is in elevated position, locating the parts of the automatic multiplier control unit in the positions shown in Fig. 6, wherein the pin 282 lies in front of the shoulder or step 288b at the lower edge of the slide 283. The step 288b is cut back beyond the "one" step 288a, and the distance between the pin and the face of the step 288b is less than the step movement of the pin, in the present instance, being approximately one half of such step distance. The step distance is equal to the distance between the centers of two adjacent teeth on the rack 267. Consequently, when the parts are in the position shown in Fig. 6, one step of movement of the rack 267 causes approximately one half of a step of movement of the slide 283. This causes the lever 291 to rock through approximately one half of its throw only. This movement of the lever 291 is sufficient to trip the detent 274 to free the rack 267, but not sufficient to raise the pin 296 to cause disengagement of the clutch control lever 203. Holding either of the keys 216 or 217 depressed, therefore, results in a reciprocation of the rack 267 through the distance of one step, without causing disengagement of the clutch, so that the actuator continues to rotate as long as either of the keys is held depressed.

In carrying out problems in division, the drum is rotated in a reverse direction a number of times equal to the number of times that the divisor will go into the dividend as a whole number. On the next rotation of the drum the counting wheels in the counting mechanism carried by the carriage are operated to expose a series of nines to the left of the dividend, thus indicating that the drum has rotated one time more than the whole number by which the dividend is divisible by the divisor. It is then necessary to rotate the drum once in the opposite direction to counteract the extra rotation of the drum which throws the nines into the counter. Means are provided for sounding an alarm and stopping the operation of the drum when the nines are thrown into the counter so that the machine may then be operated for one revolution in the reverse direction thereby showing the proper number in the divisor at the window 109a. The throwing of the nines into the counter is accompanied by a movement of the transfer levers 113 Fig. 4 to the left of the number appearing in the counter and means are provided for causing the throwing of these levers to stop the machine. Mounted in the frame of the machine and extending into the carriage at the left hand side of the machine so as to be positioned adjacent the transfer lever 113 which will comprise the furthest left active transfer lever is a lever 299, Figures 3, 4 and 12, which is provided on its end with an ear 301 which is engaged by the transfer lever when the series of nines is thrown. The movement of the transfer lever at the left, causes movement of the lever 299, Fig. 12, about its pivot and movement of this lever is employed to sound the alarm and to raise the rear end of the lever 232 to cause disconnection of the clutch. Arranged within the casing and supported on the base thereof, is a bell 302, Fig. 4, adjacent to which there is disposed the clapper 303 which is attached to the lever 299. When the lever 299 is rocked on its pivot by the movement of the transfer lever 113, the clapper strikes the bell 302 and sounds a warning. Arranged in the machine below the lever 232 and pivoted on the bracket 304, Fig. 12, is a bell crank lever 305, one arm of which is connected to the lever 299 by the link 306 and the other arm of which is provided with an ear 307 which is disposed below the rear portion of the lever 232. As the lever 299 is rocked by the left transfer lever 113, the bell crank lever 305 is rocked to lift the rear portion of the lever 232, thus freeing the clutch control lever 203 and causing the disengagement of the clutch and its locking in neutral position. When this occurs, the drum has rotated one revolution too many and the digit of the divisor indicated at the window 109ᵃ is one unit too high. The addition key 216 is then depressed, causing a single rotation of the drum in the opposite direction thus subtracting the value "1" from the digit shown at the window 109ᵃ, and clearing the nines from the counter so that the remaining value indicated in the counter constitutes the numerator of the fraction of which the denominator is the dividend. To reduce this fraction to decimals, the carriage is then stepped one point and the dividing operation repeated and carried out until the desired number of decimal places are obtained.

The casing is provided adjacent the forward portion thereof with control buttons 308 and 309, Figure 1, for opening and closing the motor circuit.

The machine may be used to perform the operations of addition, subtraction, multiplication and division. In performing the operation of addition, it frequently happens that the same number is to be added a plurality of times and, with such number entered into the keyboard, it is not necessary to use the addition key and depress such key a number of times corresponding to the number of times which said number is to be added since the value key 236 corresponding to the number of times that the value is to be added may be pressed, causing such value to be added a number of times corresponding to the value of the depressed key 236.

When it is desired that depression of either of the actuating keys 216 and 217 will cause only one rotation of the drum, regardless of the length of time that these keys are held depressed, means are provided for connecting these keys with the lever 255, Fig 8, which is set by the depression of the keys 236, in unit position so that the clutch will be disengaged after a single rotation of the drum. This may be accomplished by providing the lever 185, Fig. 5, with a pin 312 at its forward end, the pin overlying the auxiliary lever 258, Figure 8. With the non-repeat key 172 depressed, the lever 255 is positioned in the same position as it would occupy were the "1" value key 236 depressed, so that after the drum has made one revolution, the tripping mechanism is actuated to release the clutch and return the various parts to neutral position.

I claim:

1. In a power driven calculating machine, numeral wheels a reversible rotary actuator therefor, means for introducing one factor of the calculation into the actuator, keys for introducing the second factor into the machine, and means operated by the depression of one of said keys for causing the actuator to rotate to effect the calculation represented by the value of the depressed key.

2. In a motor driven calculating machine, numeral wheels, a reversible rotary actuator therefor, means for introducing one factor of the calculation into the actuator, value keys for introducing the second factor into the machine, and means operated by the depression of one of said keys for causing the motor to rotate the actuator to effect the calculation represented by the depressed key and means brought into operation at the completion of the calculation to release the motor from the actuator.

3. In a motor driven calculating machine, numeral wheels, a reversible rotary actuator therefor, means for introducing one factor of the calculation into the actuator, value keys for introducing the second factor of the calculation into the machine, a normally disengaged locked clutch between the motor and the actuator and means operated by the depression of a value key for unlocking and engaging the clutch to cause the mechanism to operate to effect the calculation represented by the value of the depressed key and means brought into operation at the completion of the calculation to disengage and lock the clutch.

4. In a motor driven calculating machine, numeral wheels, a reversible rotary actuator therefor, means for introducing one factor of the calculation into the actuator, means for connecting the motor to and disconnecting it from the actuator and value keys for determining the duration of connection of the motor to the actuator.

5. In a motor driven calculating machine, numeral wheels, a reversible rotary actuator therefor, means for introducing one of the factors of the calculation into said actuator, keys for introducing the second factor of the calculation into the machine and means for connecting the motor to the actuator to rotate the actuator in either direction to perform the calculation and release the actuator from the motor at the end of the calculation.

6. In a motor driven calculating machine, numeral wheels, a rotary actuator therefor, means for entering one factor of the calculation into said actuator, a plurality of value keys representing the second factor of the calculation and means operative by the depression of one of said value keys for connecting the motor to the actuator and determining the duration of action of the motor on said actuator.

7. In a power driven calculating machine, numeral wheels, a rotary actuator therefor, means for entering one factor of the calculation into said actuator, keys for introducing the second factor into the machine, an indicator for displaying the second factor, means actuated by the depression of a key for introducing the value thereof into the indicator, means reversible with respect to said actuator, driven from said motor, and actuated upon depression of one of said keys, means actuated by the depression of one of said keys for causing rotation of the actuator the number of times represented by the value of the depressed key and means operable at the end of the calculation for releasing said depressed key.

8. In a motor driven calculating machine, numeral wheels, a rotary actuator therefor, means for entering one factor of the calculation into said actuator, keys for introducing the second factor into the machine, an indicator for displaying said second factor, means whereby depression of one of said keys causes said motor to rotate the actuator the number of times represented by the value of the depressed second factor key and means driven by the motor for introducing the second factor into its indicator.

9. In a motor driven calculating machine, a total register, a reversible rotary actuator for actuating said register, keys for introducing values into said actuator, a plurality of value keys for determining the number of rotations of the actuator, depression of a value key serving to connect the motor to the actuator to rotate the actuator, means for holding the value key depressed and means operative upon said first means at the end of the predetermined number of revolutions of the actuator for releasing the depressed key.

10. In a motor driven calculating machine, a rotatable calculating drum adapted to contain one factor of the calculation, a register adapted to receive and display the other factor of the calculation, a plurality of value keys, means operative by the depression of a value key for causing the motor to rotate the drum the number of times represented by the value of the depressed key, means driven in time with the drum selectively operable to introduce either the second factor or its complement into said register.

11. In a motor driven calculating machine, numeral wheels, a rotatable drum for actuating the numeral wheels, means for entering values into said drum, a normally disengaged clutch interposed between the motor and the drum, a lever locking the clutch in full cycle position and movable to cause engagement of said clutch, a lever for moving said clutch lever and a key which, when depressed, moves said second lever.

12. In a calculating machine, a rotatable counting mechanism actuating device, means for locking said device in neutral position, means for entering values into said device, a driving shaft normally disconnected from said device, and differentially adjustable means operable in time with said device for unlocking said device and connecting said shaft and device.

13. In a calculating machine, numeral wheels, a rotary actuator therefor, means for predetermining the number of revolutions of the actuator, comprising a plurality of value keys of different denominations, a trip device common to all of said keys means operated by the depression of any key for initiating the calculating operation and differentially positioning the trip device and means actuated by the trip device for terminating the calculating operation.

14. In a motor driven calculating machine, numeral wheels, a rotary actuator therefor, depressible keys for introducing values into the actuator, means for holding the depressed keys in depressed position, a normally disengaged clutch interposed between the motor and the actuator, an addition key, means operative by the depression of the addition key for causing engagement of the clutch, a non-repeat key, means positioned thereby and actuated by the first revolution of the actuator for releasing said first two means.

15. In a motor driven calculating machine, numeral wheels, a reversible rotary actuator therefor, keys for introducing values into the actuator, a normally disengaged clutch between the motor and the actuator, a laterally slidable reverse gear between the motor and the actuator, addition and subtraction keys, means operated by the depression of the addition key to engage the clutch to cause the motor to rotate the actuator in one direction, and means operated by the depression of the subtraction key for sliding said reversing gear and causing engagement of the clutch.

16. In a motor driven calculating machine, a reversible rotary counter mechanism actuating drum, means for entering values into said drum, a normally disengaged clutch comprising a driving member connected to the motor and a driven member connected to the drum, a spring pressed lever normally engaging and locking the driven member and holding the clutch disengaged, a key, a lever associated therewith and with the spring pressed lever, depression of the key serving to move the spring pressed lever to free the driven member and engage the clutch and hold the spring pressed member in such position against the urge of the spring and means operated by the rotation of the drum for moving said second lever to release the spring pressed lever.

17. In a motor driven calculating machine, numeral wheels, a rotary actuator therefor, means for entering values into the actuator, a drive shaft connected to said actuator, a normally disengaged clutch interposed between the motor and the drive shaft, reversing gearing interposed between the clutch and the actuator, a clutch control lever, a key, a second lever operative by the depression of the key for moving the clutch control lever to engage the clutch, a slide, means operated by the rotation of the drive shaft for moving said slide and means operative by the movement of the slide for releasing the second lever from the clutch control lever.

18. In a motor driven calculating machine, numeral wheels, a rotary actuator therefor, means for entering values into the actuator, a clutch comprising a driving member connected to the motor and a driven member connected to the actuator, a lever controlling the clutch, said lever normally holding the clutch disengaged, a key, means operated by the depression of the key for moving said lever to cause engagement of the clutch, a slide, means on the driven member for moving said slide upon rotation of the driven member, means operated by the movement of said slide serving to release the clutch lever to cause release of the clutch and for restoring the slide to initial position.

19. In a motor driven calculating machine, numeral wheels, a rotary actuator therefor, means for entering values into the actuator, a clutch comprising a driving member connected to the motor and a driven housing connected to the actuator, a pawl pivoted to the housing and spring pressed toward the driving member, said housing having an aperture therein into which the pawl extends, a clutch control lever adapted to enter said aperture to lock the housing against rotation and move the pawl from engagement with the driving member, a plurality of actuator starting control keys, depression of either key serving to move the clutch control lever to release the housing and cause engagement of the clutch, release of the depressed key serving to cause disengagement of the clutch.

20. In a motor driven calculating machine, numeral wheels, actuating means therefor reversibly operable to actuate the numeral wheels forwardly or reversely, and means for stopping the actuating means in neutral position, including a spring pressed restrained element and means actuated by the rotation of the actuating means for releasing said element during forward or reverse movement of the actuating means.

21. In a motor driven calculating machine, numeral wheels, rotary actuating means therefor, reversibly operable to actuate the numeral wheels forwardly or reversely, a clutch, one element of which is connected to the motor and the other element of which is connected to the actuating means, and means for stopping the actuating means in neutral position, including a spring pressed restrained element adapted to engage the clutch element connected to the actuating means and means actuated by rotation of the latter clutch element for releasing the spring pressed element during forward or reverse movement of the actuating means.

22. In a motor driven calculating machine, a rotatable calculating drum, keys for introducing values into said drum, keys for determining the number of rotations of the drum and means operated by the depression of one of the latter keys for connecting the motor to the drum for a sufficient time to rotate the drum the number of times represented by the value of the depressed key.

23. In a motor driven calculating machine, a reversible rotatable calculating drum, keys for introducing values into said drum, keys for determining the number of rotations of the drum and means operated by the depression of one of the latter keys for connecting the motor to the drum for a sufficient time to rotate the drum the number of times represented by the value of the depressed key and means operated in time with the rotation of the drum in either direction for disconnecting the motor from the drum when the drum has rotated the selected number of times.

24. In a motor driven calculating machine, a total register, a reversible rotatable drum adapted to operate said register, keys for introducing values into the drum, a clutch interposed between the motor and the drum, a plurality of value keys of different denomination and means operative by the depression of a value key for causing said clutch to connect the motor directly to the drum to cause the motor to rotate the drum the number of times represented by the value of the depressed value key.

25. In a motor driven calculating machine, numeral wheels, a rotatable drum for actuating said wheels, means for entering values into said drum, a normally disengaged clutch interposed between the motor and the drum, a plurality of value keys of different denomination, means operative by the depression of a value key for causing engagement of said clutch and means operated by the rotation of the clutch a number of times equal to the value of the depressed key for disengaging the clutch.

26. In a motor driven calculating machine, a rotary counter mechanism actuating device, means for entering values into said device, a normally disengaged clutch interposed between said motor and device, means normally locking the clutch in full cycle position, a plurality of value keys of different denomination, means actuated by the depression of a key for unlocking and engaging said clutch and means operative in time with the device for disengaging and locking the clutch when the device has actuated the counting mechanism the number of times corresponding to the value of the depressed key.

27. In a motor driven calculating machine, a rotatable counter mechanism actuating drum, means for entering values into said drum, a normally disengaged clutch interposed between the motor and the drum, a lever controlling said clutch, a plurality of value keys of different denomination, means operative by the depression of a key for moving said lever to cause the engagement of the clutch, a slide arranged to be moved in time with the rotation of the drum, a second slide adapted, when moved, to cause disengagement of the clutch and means carried by the first slide and comomn to all of said value keys for moving said second slide to disengage the clutch when the drum has rotated the number of times represented by the value of the depressed key.

28. In a motor driven calculating machine, a counter mechanism actuating drum, means for entering values into said drum, a normally disengaged clutch interposed between the motor and the drum, a lever controlling said clutch, a plurality of value keys of different denomination, an actuator common to all of said keys arranged to be moved in time with the rotation of the drum, means operative by the depression of any key for positioning said actuator in accordance with the value of the depressed key and to actuate said clutch controlling lever to cause engagement of the clutch, a slide adapted to be moved by said actuator when said actuator has moved a distance corresponding to the value of the depressed key and means actuated by the movement of said slide for disengaging the clutch.

29. In a motor driven calculating machine, a counter mechanism actuating drum, means for entering values into said drum, a normally disengaged clutch interposed between the motor and the drum, a lever controlling said clutch, a plurality of value keys of different denomination, a slide arranged to be moved in time with the rotation of the drum, means operative by the depression of any key for positioning said slide in accordance with the value of the depressed key and to move the clutch lever to cause engagement of the clutch, means operated by the rotation of the drum for causing a step-by-step movement of said slide, a second slide adapted to be moved by said first slide when said first slide has moved a number of steps corresponding to the value of the depressed key and means actuated by the movement of the second slide for moving said clutch lever to cause disengagement of the clutch.

30. In a motor driven calculating machine, a counter mechanism actuating drum, means for entering values into said drum, a normally disengaged clutch interposed between the motor and the drum, a lever controlling said clutch, a plurality of value keys of different denomination, a slide arranged to be moved in time with the rotation of the drum, means operative by the depression of a key for positioning said slide in accordance with the value of the depressed key and to actuate said clutch lever to cause engagement of the clutch, means operated by the rotation of the drum for causing a step-by-step movement of said slide, a second slide adapted to be engaged by said first slide when said first slide has moved a number of steps equal to one less than the value of the depressed key, the final step of movement of the first slide serving to move the second slide and means actuated by the movement of the second slide for disengaging the clutch.

31. In a motor driven calculating machine, a counter mechanism actuating drum, means for entering values into said drum, a normally disengaged clutch interposed between the motor and the drum, a lever controlling said clutch, a plurality of value keys of different denomination, a slide arranged to be moved in time with the rotation of the drum, means operative by the depression of a key for positioning said slide in accordance with the value of the depressed key and to cause engagement of the clutch, means operated by the rotation of the drum for causing a step-by-step movement of said slide, a second slide adapted to be engaged by said first slide when said first slide has moved a number of steps equal to one less than the value of the depressed key, the final step of movement of the first slide serving to move the second slide and means actuated by the movement of the second slide for disengaging the clutch and releasing said first slide to permit it to be returned to neutral position.

32. In a motor driven calculating machine, a counter mechanism actuating drum, means for entering values into said drum, a normally disengaged clutch interposed between the motor and the drum, a lever controlling said clutch, a plurality of value keys of different denomination, a slide arranged to be moved in time with the rotation of the drum, means operative by the depression of a key for positioning said slide in accordance with the value of the depressed key and to cause engagement of the clutch, means operated by the rotation of the drum for causing a step-by-step movement of the slide, a spring opposing the movement of said slide, a latch for holding the slide in advanced position, a second slide adapted to be moved by said first slide when said first slide has moved a number of steps corresponding to the value of the depressed key, means actuated by the movement of the second slide for disengaging the clutch and releasing said latch.

33. In a motor driven calculating machine, a counter mechanism actuating drum, means for entering values into said drum, a normally disengaged clutch interposed between the motor and the drum, a lever controlling said clutch, a plurality of value keys of different denomination, a slide arranged to be moved in time with the rotation of the drum, means operative by the depression of a key for positioning said slide in accordance with the value of the depressed key and to cause engagement of the clutch, means operated by the rotation of the drum for causing a step-by-step movement of the slide, a spring opposing the movement of said slide, a latch for holding the slide in advanced position, a movable step plate adapted to be moved by said slide when the slide has moved a number of steps corresponding to the value of the depressed key and a lever carried by said plate and arranged to be moved by movement of the plate, to release said clutch.

34. In a calculating machine, a counting mechanism actuating device, means for entering values into said device, a driving shaft normally disconnected from said device, a clutch interposed between said shaft and device, a clutch controlling device, a plurality of value keys of different denomination, a single slide arranged to be moved in a step-by-step movement in time with the operation of the counting mechanism actuating device, means operative by the depression of any key for positioning the slide in accordance with the value of the depressed key and to actuate said clutch controlling device to cause engagement of the clutch and a member adapted to be moved by said slide to disengage the clutch when the slide has moved the number of steps represented by the value of the depressed key.

35. In a calculating machine, a counting mechanism actuating device, means for entering values into said device, a driving shaft normally disconnected from said device, a clutch interposed between said shaft and device, a clutch controlling device, a plurality of value keys of different denomination, a slide arranged to be moved in a step-by-step movement in time with the operation of the counting mechanism actuating device, means operative by the depression of any key for positioning the slide in accordance with the value of the depressed key and to cause engagement of the clutch, a member adapted to be moved by said slide to disengage the clutch when the slide has moved the number of steps represented by the value of the depressed key and means actuated by the movement of said member for restoring the slide.

36. In a calculating machine, a counting mechanism actuating device, means for entering values into said device, a driving shaft normally disconnected from said device, a clutch interposed between said shaft and device, a clutch controlling device, a plurality of value keys of different denomination, a slide arranged to be moved in time with the operation of the counting mechanism actuating device, an angularly adjustable member carried by said slide, means operative by the depression of any key for positioning the adjustable member in accordance with the value of the depressed key and means operative by the movement of the adjustable member for a distance corresponding to the value of the depressed key, for disengaging said clutch.

37. In a calculating machine, a counting mechanism actuating device, means for entering values into said device, a driving shaft normally disconnected from said device, a clutch interposed between said shaft and device, a clutch controlling device, a plurality of value keys of different denomination, a slide arranged to be moved in time with the operation of the counting mechanism actuating device, an angularly adjustable member carried by said slide, means operative by the depression of any key for positioning adjustable member in accordance with the values of the depressed key and to actuate said clutch controlling device for engaging said clutch whereby said adjustable member is moved and means operative by the movement of the adjustable member for a distance corresponding to the value of the depressed key, for disengaging said clutch and releasing the adjustable member to permit it to return to neutral position.

38. In a calculating machine, a counting mechanism actuating device, means for entering values into said device, a driving shaft normally disconnected from said device, a clutch interposed between said shaft and device, a clutch controlling device, a plurality of value keys of different denomination, a slide arranged to be moved in time with the operation of the counting mechanism actuating device, an angularly adjustable member carried by said slide, means operative by the depression of a key for positioning the adjustable member in accordance with the value of the depressed key and engaging said clutch whereby said adjustable member is moved, a movable stepped plate adapted to be moved by said adjustable member when said member has been moved a distance corresponding to the value of the depressed key and means operative by the movement of the plate for disengaging the clutch.

39. In a calculating machine, a counting mechanism actuating device, means for entering values into said device, a driving shaft normally disconnected from said device, a clutch interposed between said shaft and device, a clutch controlling device, a plurality of value keys of different denomination, a spring retracted slide arranged to be moved in time with the operation of the counting mechanism actuating device, an angularly adjustable member carried by said slide, means operative by the depression of a key for positioning the adjustable member in accordance with the value of the depressed key and engaging said clutch whereby said adjustable member is moved, a movable stepped plate adapted to be moved by said adjustable member when said member has been moved a distance corresponding to the value of the depressed key and means operative by the movement of the plate for disengaging the clutch and releasing the adjustable member to permit it to return to neutral position.

40. In a calculating machine, a movable stepped plate, means operated by the movement of said plate for halting the calculating operation, a slide movable by the calculating mechanism with respect to said plate, a contact member carried by said slide and adjustable with respect to the stepped face of said plate and depressible keys for adjusting said contact member to variable positions.

41. In a motor driven calculating machine, a rotatable counting mechanism actuating device, a normally disengaged and locked clutch between the motor and the device, reversing gearing between the motor and the device, a key, means actuated by the depression of the key for unlocking and engaging said clutch and means actuated by the depression of the key for shifting said reversing gearing to reverse the direction of rotation of the actuating device.

42. In a motor driven calculating machine, numeral wheels, a rotary actuator therefor, means for introducing values into the actuator, a normally disengaged clutch between the motor and the actuator, an addition key, a subtraction key, means operated by the depression of either key for causing engagement of the clutch and settable means operated by a single rotation of the actuator for causing disengagment of said clutch while either key is held depressed.

43. In a calculating machine, numeral wheels, a rotary actuator therefor, means motor driven for introducing values into the actuator, a normally disengaged clutch between the motor and the actuator, reversing gearing between said motor and actuator, a key, means actuated by the depression of the key for shifting said reversing gearing, means actuated by the depression of the key for causing engagement of said clutch and settable means operated by a single rotation of the actuator for causing disengagement of said clutch while the key is held depressed.

44. In a motor driven calulating machine, a counting mechanism actuating device, a normally disengaged clutch between the motor and the device, an addition key for engaging the clutch, a value lever, means positioned by the value lever for determining the number of rotations of the device, a non-repeat key, means actuated by the depression of the non-repeat key for positioning the value lever in position to cause one rotation only of the device.

45. In a calculating machine, numeral wheels, a reversible rotary actuator therefor, driving means including a motor, a clutch and reversing gearing and means normally holding the gearing in position to cause forward rotation of the actuator, positive and negative actuation keys and means whereby the positive key may be manually operated to cause engagement of the clutch and means whereby the negative key may be operated to shift the reversing gearing and cause engagement of the clutch.

46. In a calculating machine, numeral wheels, a reversible rotary actuator therefor, driving means normally arranged to cause forward rotation of the actuator including manually settable means to determine reverse rotation of the actuator.

47. In a calculating machine, numeral wheels, actuating means therefor, driving means including a motor, a freely retractable operating member, means whereby said member may be manually operated to initiate a registration on said wheels and manually released to terminate a registration, in combination with means selectively settable to operate said member to initiate a registration on said wheels and to automatically release said member to terminate a selected number of registrations on said wheels.

48. In a motor driven calculating machine, reversible numeral wheels, a reversible rotary actuator therefor, a clutch interposed between the motor and the actuator, a key for controlling the clutch and initiating forward rotation of the actuator, a key for controlling the clutch and initiating reverse rotation of the actuator and a plurality of keys of different numerical values for controlling the clutch and initiating a predetermined number of rotations of the actuator.

49. In a calculating machine, numeral wheels, a reversible rotary actuator therefor, and means for imparting to said actuator one or more cycles of continuous forward or reverse rotation including a motor rotatable in a single direction and control devices including a key operable to initiate forward drive, a key operable to initiate reverse drive and a plurality of keys operable to initiate forward drive and determine the number of cycles of operation of the actuator.

50. In a calculating machine, numeral wheels, a reversible rotary actuator therefor, and means for determining one or more cycles of forward or reverse operation, including a key manually operable to initiate the actuation and manually releasable to terminate the actuation and a plurality of keys of different numerical values manually settable to initiate the actuation and automatically determine the duration thereof, means for holding the depressed value key in depressed position and means under the control of said first means for releasing said holding means upon the completion of a predetermined number of cycles of operation of the actuator.

51. In a motor driven calculating machine, numeral wheels, a rotary actuator therefor, means for entering one factor of the calculation into said actuator, keys for introducing the second factor into the machine, a second series of numeral wheels for displaying the second factor, means reversible with respect to said actuator, driven from said motor, and actuated upon depression of one of said keys, for introducing the value of the depressed key into the second series of numeral wheels, and means actuated by the depression of one of said keys for causing rotation of the actuator the number of times represented by the value of the depressed key.

52. In a motor driven calculating machine, numeral wheels, a rotary actuator therefor, means for entering one factor of the calculation into the actuator, a register for displaying the second factor of the calculation, an actuator therefor, means for controlling the operation of said actuator in accordance with said second factor, depressible keys for adjusting said means, means for maintaining a depressed key in depressed position, during introduction of said second factor into said register controlled by said first means for releasing said key upon completion of said operation.

53. In a motor driven calculating machine, numeral wheels, a rotary actuator therefor, means for entering one factor of the calculation into the actuator, keys for introducing the second factor into the machine, a clutch for connecting the motor to the actuator, clutch controlling means, means driven by the motor for actuating said clutch controlling means to disengage the clutch upon completion of the calculation represented by the value of the depressed second factor key, said clutch controlling means serving to lock the actuator in neutral stopping position.

54. In a motor driven calculating machine, numeral wheels, a rotary actuator therefor, means for introducing one factor of the calculation into the actuator, a universal mechanism for controlling the extent of rotation of the actuator, means manually operable to determine the operation of the universal mechanism and means selectively adjustable to automatically predetermine the operation of the universal mechanism to rotate the actuator a predetermined number of times.

55. In a motor driven calculating machine, a calculating mechanism comprising a rotatable actuator means for introducing values into said mechanism, an actuating key, means operative by the depression of the actuating key for causing the motor to drive the calculating mechanism, settable means operated during the first rotation of the actuator for disconnecting the motor from the actuator and stopping the actuator at the end of the first rotation.

56. In a motor driven calculating machine, numeral wheels, a rotary actuator calculating mechanism therefor, comprising setting elements, numeral keys for adjusting said elements, retaining means for said numeral keys, locking means for said elements, value keys for introducing and predetermining the extent of rotation of the actuator, retaining means for said value keys, mechanism operable in time with the actuator for releasing the numeral key retaining means during the operation of the machine and for releasing the value key retaining means and setting element locking means at the completion of the operation.

57. In a motor driven calculating machine, a reversible rotary actuator therefor, means for introducing values into said actuator, means selectively operable to control the extent and direction of rotation of the actuator, and settable means operable in time with the actuator for limiting the rotation of the actuator in either direction to one rotation.

58. In a motor driven calculating machine, numeral wheels, a rotary actuator therefor, means for entering one factor of the calculation into said actuating means, keys for introducing the second factor into the machine, restraining and releasing means for said second factor keys, and means for displaying the value of a depressed second factor key after said key is released.

59. In a motor driven calculating machine, numeral wheels, a rotary actuator calculator mechanism therefor, comprising setting element indicators, numeral keys for adjusting said indicators, retaining means for said numeral keys, locking means for said indicators, value keys for introducing and predetermining the extent of rotation of the actuator, retaining means for said value keys, mechanism operable in time with the actuator for releasing the numeral key retaining means during the operation of the machine and for releasing the value key retaining means and indicator locking means at the completion of the operation.

60. In a motor driven calculating machine, numeral wheels, a rotary actuator calculating mechanism therefor comprising setting element indicators normally urged to zero position, numeral keys for adjusting said indicators, retaining means for said numeral keys, locking means for said indicators, value keys for introducing and predetermining the extent of rotation of the actuator, retaining means for said value keys, mechanism operable in time with the actuator for releasing the numeral key retaining means during the operation of the machine and for releasing the value key retaining means and indicator locking means at the completion of the operation.

61. In a motor driven calculating machine, numeral wheels, a rotary actuator therefor, a revolution counter, an actuator therefor, operable in time with said first actuator, a positive sign key for controlling the rotation of the actuator in a positive direction, a negative sign key for controlling the rotation of the actuator in a reverse or negative direction, and means settable to effect rotation of the revolution counter actuator like or unlike the sign of either key.

62. In a motor driven calculating machine, numeral wheels, a rotary actuator therefor, means for entering values into said actuator, a normally disengaged clutch interposed between the motor and the actuator, a lever controlling said clutch, a second lever operative to move the first lever to cause engagement of the clutch, a plurality of value keys of different denominations, a clutch lever actuator, and means brought to operation by the depression of any value key for moving said clutch lever actuator to engage the clutch and hold said clutch lever actuator in operative position for a period of time corresponding to the value of a depressed key.

63. In a motor driven calculating machine, a rotary counter mechanism actuating device, means for entering values into said device, a normally disengaged clutch interposed between said motor and device, a plurality of value keys of different denominations, means actuated by the depression of a key for engaging said clutch, and means common to all of the keys arranged to be moved into operative position by the depression of any key and operative in time with the device for causing disengagement of the clutch and stopping of the device in neutral position when the device has actuated the counting mechanism the number of times corresponding to the value of the depressed key.

64. In a motor driven calculating machine, numeral wheels, a reversible rotary actuator therefor, means for entering values into said actuator, an automatic multiplier unit comprising means selectively settable for predetermining a multiplier figure and spring retracted means operable in time with the actuator and advanced by a step by step movement to terminate the operation.

65. In a calculating machine, numeral wheels, a rotary actuator therefor, a driving mechanism for said actuator, a manually operated control mechanism associated with said driving mechanism for initiating rotation of said actuator in either direction and for terminating said rotation after one or more revolutions, in combination with an auxiliary optionally settable control mechanism cooperating with said first control mechanism to automatically terminate the rotation of said actuator after a single revolution.

66. In a calculating machine, numeral wheels, reversible actuating means therefor, driving means including a motor, means including a plurality of value keys selectively operable to initiate and effect transmission of movement from the motor to the actuator, and means for stopping the actuator upon completion of the initiated operation while any of said keys are held depressed.

67. In a motor driven calculating machine, numeral wheels, a reversible rotary actuator therefor, a rotation control mechanism for said actuator for determining the extent and direction of rotation of said actuator, and manually operable mechanism for determining the operation of said first mechanism and a manually adjustable automatically operable mechanism for predetermining the operation of said first mechanism.

68. In a motor driven calculating machine, numeral wheels, a reversible rotary actuator therefor, a plurality of value keys each operable by a single manual stroke to initiate an additive rotation of the actuator corresponding to the value of a depressed value key.

69. In a calculating machine, numeral wheels, a reversible rotary actuator therefor, clutching and transmission mechanism for rotating said actuator including a gear, and means operable by a single manual stroke to control the action of said gear and to determine the extent of rotation of the actuator.

70. In a motor driven calculating machine, numeral wheels, a reversible rotary actuator therefor, predetermined rotation control means including a releasing member having its contact faces graded with respect to its length and means operable by a single manual stroke for determining the time at which said member is engaged to terminate the registration after a predetermined number of revolutions.

71. In a motor driven calculating machine, numeral wheels, a reversible rotary actuator therefor, setting means including value keys and a member differentially settable thereby for determining the number of rotations of said actuator.

72. In a motor driven calculating machine, numeral wheels, a reversible rotary actuator therefor, a rotation control unit including a member having a toothed surface spring actuated means for engaging said toothed surface and actuating means for said member, which causes said member to advance step by step, said spring actuated means acting to prevent the return of said toothed member until a predetermined number of rotations of said actuator has been completed.

73. In a motor driven calculating machine, numeral wheels, a rotary actuator therefor, a clutch and transmission mechanism and operating mechanism comprising a clutch engaging member and a clutch operating member normally held in coupled position, and means operable by a single manual stroke for operating said operating mechanism to initiate and effect a predetermined number of rotations of said actuator, and including a trip mechanism for tripping and uncoupling said clutch engaging and operating members after a predetermined number of rotations of the actuator.

74. In a motor driven calculating machine, numeral wheels, a reversible rotary actuator therefor, a plurality of value keys of different denominations for determining the extent of rotation of said actuator, retaining means for said value keys by which said value keys are held in depressed position when depressed, a clutch for connecting said motor and said actuator, an operating mechanism for said clutch normally held in coupled position, a rotation control unit associated with said mechanism for determining the number of rotations of said actuator, and means adapted to be operated by said rotation control unit to uncouple the operating mechanism and to release said retaining means.

75. In a motor driven calculating machine, numeral wheels, a reversible rotary actuator therefor, a plurality of value keys of different denominations spaced a like distance apart, a differential rotation control mechanism including a member settable to differential selected positions, and means operable in time with the actuator for stopping the actuator and for restoring said differentially settable member to zero or initial position.

76. In a motor driven calculating machine, numeral wheels, a reversible rotary actuator therefor, a plurality of value keys for predetermining the extent of rotation of the actuator, rotation control means including a toothed member normally restrained in initial or zero position, and means operable in time with the actuator for advancing said member in a step by step movement until the actuator has rotated the number of times represented by the value of a depressed value key, and for releasing said toothed member at the end of an operation.

77. In a motor driven calculating machine, numeral wheels, a reversible rotary actuator therefor, means for stopping the actuator in full cycle position, a plurality of value keys of different denominations, a multiplier unit comprising a rotatable member and a slidable member, both adapted to be operated in time with the actuator, and means controlled by said member serving to actuate the stopping means to stop the actuator after a predetermined number of rotations.

78. In a motor driven calculating machine, numeral wheels, a rotary actuator therefor, a clutch for controlling rotation for said actuator, including a member rotatable in a single direction to rotate said actuator in a forward or reverse direction, and a member invariably operated to connect said motor to said actuator for forward or reverse rotation.

79. In a motor driven calculating machine, numeral wheels, a reversible rotary actuator therefor, direction control means for said actuator including a fulcrumed lever having two extensions thereon operable by either the plus operating member or by the minus operating member for the purpose of positively determining the direction of operation of the actuator and to prevent depression of said plus and minus operating members simultaneously.

80. In a calculating machine having a rotatable actuator, normally operative means for delimiting movement of said actuator while permitting movement thereof within full-cycle position, means for latching said delimiting means in inoperative position during operation of said actuator, and means for tripping said latch.

81. In a calculating machine having a rotatable actuator, means resiliently urged to operative position for delimiting movement of said actuator while permitting movement thereof within full-cycle position, means for latching said delimiting means in inoperative position during operation of said actuator, and means for tripping said latch.

82. In a calculating machine having a rotatable actuator, normally operative means for locking said actuator against calculating operation while permitting movement thereof within full-cycle position, means for latching said locking means in inoperative position during operation of said actuator, and means for tripping said latch.

83. In a calculating machine having a rotatable actuator, means resiliently urged to position to lock said actuator against cyclic movement, means for latching said locking means in inoperative position during operation of said actuator, means for tripping said latch, and separate means for preventing operation of said lock before said actuator reaches full cycle position.

84. In a calculating machine a rotary actuator, a motor, a controllable driving connection between said actuator and said motor, means for locking said actuator against cyclic movement, latching means for retaining said locking means disabled during enablement of said driving connection, means for concomitantly tripping said latching means and disabling said driving connection, and separate means for preventing operation of said lock before said actuator reaches full-cycle position.

85. In a calculating machine, a rotatable actuator, driving means therefor, normally operative means for delimiting movement of said actuator while permitting movement thereof within full-cycle position, means for latching said delimiting means in inoperative position during operation of said actuator, and means operable by said driving means for tripping said latching means to release said delimiting means to operative position.

86. In a calculating machine, a rotatable actuator, driving means therefor, normally operative means for delimiting movement of said actuator while permitting movement thereof within full-cycle position, means for latching said delimiting means in inoperative position during operation of said actuator, and means operable in time with said actuator for tripping said latching means to release said delimiting means to operative position.

87. In a motor driven calculating machine, a rotatable actuator, means intermediate the actuator and the motor for controlling the engagement and direction of drive of the actuator, means for locking the actuator against cyclic movement in either direction, a key, and means controlled by said key upon operation thereof for determining the engagement and direction of the drive and operating said lock.

88. In a calculating machine, a reversible rotary actuator, driving means therefor, means for controlling the operation and direction of drive of said actuator by said driving means, means for locking said actuator against cyclic movement in either direction, and means operable as an incident to the operation of said control means for controlling said locking means.

89. In a calculating machine, a rotary actuator, a motor, a controllable driving connection between said actuator and said motor, manual means for enabling said connection, and means operative upon manual release of said means for disabling said connection and for effecting and maintaining positive delimitation of the movement of the actuator while permitting movement thereof within full-cycle position.

90. In a calculating machine, a rotary actuator, a motor, a controllable driving connection between said actuator and said motor, a key, and a member controllable by said key for disabling said driving connection and for effecting and maintaining positive delimitation of the movement of said actuator while permitting movement thereof within full-cycle position.

91. In a calculating machine, a rotary actuator, a motor, a controllable driving connection between said actuator and said motor, a key, and an oscillatory lever controlled by said key for disabling said driving connection and for effecting and maintaining positive delimitation of the movement of said actuator while permitting movement thereof within full-cycle position.

92. In a calculating machine a rotary actuator, a motor, a controllable driving connection between said actuator and said motor, a key, and a bell-crank controlled by said key for disabling said driving connection and for effecting and maintaining positive delimitation of the movement of said actuator while permitting movement thereof within full-cycle position.

93. In a calculating machine having a rotatable actuator, means for delimiting movement of said actuator while permitting movement thereof within full-cycle position and a manual control for said means, said delimiting means being adapted to remain effective until subsequent operation of the machine.

94. In a calculating machine having a rotatable actuator, means for delimiting movement of said actuator while permitting movement thereof within full-cycle position and means controlled by the operation of the machine for operating said means, said delimiting means being adapted to remain effective until subsequent operation of the machine.

95. In a calculating machine having a rotatable actuator, means for delimiting movement of said actuator while permitting movement thereof within full-cycle position, and a plurality of selectively operable controls for said means, said delimiting means being adapted to remain effective until subsequent operation of said controls.

96. In a calculating machine having a rotatable actuator, means for delimiting movement of said actuator, means for latching said delimiting means in inoperative position, means for tripping said latch, and means for preventing operation of said delimiting means, after said latch has been tripped, before said actuator reaches full cycle position.

97. In a calculating machine, a reversible rotary actuator, driving means therefor, means for controlling the operation and direction of drive of said actuator by said driving means, means for delimiting rotary movement of said actuator while permitting movement thereof within full-cycle position, and means operable as an incident to the operation of said control means for controlling said delimiting means, said delimiting means being adapted to remain effective while said driving means is ineffective.

98. In a calculating machine, a reversible rotary actuator, driving means therefor, means for controlling the operation and direction of drive of said actuator by said driving means, and means for delimiting rotary movement of said actuator while permitting movement thereof within full-cycle position, said delimiting means being adapted to remain effective while said driving means is ineffective.

99. In a motor driven calculating machine, a reversible rotary actuator, selectively operable manual controls for determining the engagement of and direction of the drive of said actuator, and means for loosely delimiting movement of said actuator operable by said controls, said delimiting means being adapted to remain effective until subsequent operation of one of said controls.

100. In a motor driven calculating machine, registering mechanism, an actuator therefor, clutching and reversing means for said actuator, plus and minus keys for determining the direction and extent of drive of said actuator, and manually settable means for reversing the effect of the drive determined by operation of said plus and minus keys.

101. In a motor driven calculating machine, registering mechanism, an actuator therefor, clutching and reversing means for said actuator, plus and minus keys for controlling said clutching and reversing means, a second reversing mechanism for said actuator, and a manually settable control therefor.

102. In a motor driven calculating machine, registering mechanism, an actuator therefor, motor operation control keys for determining positive and negative actuation of said registering mechanism by said actuator, and means for reversing the actuation determined by operation of said keys.

103. In a motor driven calculating machine, registering mechanism, an actuator therefor, clutching and reversing means for said actuator, control means for determining the extent and direction of drive of said actuator, and settable means for reversing the effect of the drive determined by said control means.

104. In a motor driven calculating machine having reversible numeral wheels, rotary actuators therefor, a motor drive connection for said actuators and additive and subtractive motor operation control keys; mechanism normally delimiting movement of said actuators, and control means manipulable through either motor key to release said delimiting mechanism, to determine the direction of operation of the numeral wheels and to establish the motor drive connection.

105. In a motor driven calculating machine having reversible numeral wheels, rotary actuattors therefor, a motor drive connection for said actuators and additive and subtractive motor operation control keys; mechanism normally delimiting movement of said actuators, and control means manipulative through either motor key to release said delimiting mechanism, to determine the direction of operation of the numeral wheels, to establish the motor drive connection, and operable upon release of the motor key to render said delimiting mechanism again effective.

106. In a motor driven calculating machine, numeral wheels, a reversible, rotary actuator therefor, a manually operable drive controlling member freely retractible upon release, means remaining effective after successive oscillations of said actuator, for locking the actuator against free rotation in either direction following the retraction of said member and means for bringing the actuator to rest in full-cycle position.

107. In a motor driven calculating machine, numeral wheels, a reversible, rotary actuator therefor, a manually operable drive controlling member freely retractable upon release, means for locking the actuator against free rotation in either direction following retraction of said member, means for bringing the actuator to rest in full-cycle position and means operable upon actuation of the drive controlling member to hold the locking member in inactive position.

108. In a motor driven calculating machine, numeral wheels, an actuator therefor having a reversible cycle of operation, a clutch and reversing mechanism between the motor and the actuator, means remaining effective after successive oscillations of said actuator, for locking the actuator against rotation at the end of a calculation and means for centering the actuator in full-cycle position.

109. In a motor driven calculating machine, numeral wheels, an actuator therefor, a clutch between the motor and the actuator and stopping means for the actuator comprising means remaining effective after successive oscillations of said actuator, for locking the actuator so that it has limited freedom of movement to either side of full cycle position and means operable after the actuator passes through full-cycle position to return it to full-cycle position.

110. In a motor driven calculating machine, numeral wheels, a rotary actuator therefor, a clutch between the motor and the actuator, the driven clutch member being connected to the actuator, and stopping means comprising means for locking the actuator against rotation at the end of a calculation, means for bringing the actuator to rest in full-cycle position and means for bringing the driven clutch member to rest in full-cycle position.

111. In a motor driven calculating machine, numeral wheels, an actuator therefor having a reversible cycle of operation and having an idle phase on each side of full-cycle position, a manually operable drive controlling member freely retractable from active position upon release, means remaining effective after successive oscillations of said actuator, for locking the actuator following the retraction of said member, said locking means permitting movement of the actuator within the idle phase and means for stopping the actuator in full-cycle position.

112. In a motor driven calculating machine, numeral wheels, a reversible rotary actuator therefore having full-cycle position, means for controlling the rotation of said actuator, operable at the beginning of a calculation to cause said motor to rotate said actuator, and operable at the end of a calculation to discontinue the driving of said actuator by said motor, and means including a member movable in time with the actuator, remaining effective after successive oscillations of said actuator, and controlled by said rotation controlling means to lock said actuator in full-cycle position.

113. In a motor driven calculating machine, numeral wheels, a reversible rotary actuator therefor having full-cycle position, means for controlling the rotation of said actuator, operable at the beginning of a calculation to cause said motor to rotate said actuator, and operable at the end of a calculation to discontinue the driving of said actuator by said motor, and means including a member movable in time with the actuator, remaining effective after successive oscillations of said actuator, and controlled by said rotation controlling means to arrest and lock said actuator in full-cycle position.

114. In a motor driven calculating machine, numeral wheels, a reversible rotary actuator therefor having full-cycle position, means for controlling the rotation of said actuator, operable at the beginning of a calculation to cause said motor to rotate said actuator, and operable at the end of a calculation to discontinue the driving of said actuator by said motor, and means comprising a first member movable in time with the actuator and a second member controlled by said rotation controlling means and remaining effective after successive oscillations of said actuator to lock said actuator in full-cycle position.

115. In a motor driven calculating machine, numeral wheels, a reversible rotary actuator therefor having full-cycle position, means for controlling the rotation of said actuator, operable at the beginning of a calculation to cause said motor to rotate said actuator, and operable at the end of a calculation to discontinue the driving of said actuator by said motor, and means comprising a first member movable in time with the actuator, and a second member controlled by said rotation controlling means and remaining effective after successive oscillations of said actuator said second member being movable into obstructing relation with said first member to positively lock said first member and said actuator in full-cycle position.

116. In a motor driven calculating machine, numeral wheels, a reversible rotary actuator therefor having full-cycle position, means for controlling the rotation of said actuator, operable at the beginning of a calculation to cause said motor to rotate said actuator, and operable at the end of a calculation to discontinue the driving of said actuator by said motor, and means to lock said actuator in full-cycle position comprising a first member movable in time with said actuator from a position which corresponds to the full-cycle position of said actuator and back to said full-cycle position, and a second member controlled by said rotation controlling means and adapted to hold said first member in said full-cycle position after successive oscillations of said actuator.

117. In a calculating machine, numeral wheels, a reversible rotary actuator therefor having a full-cycle position, means for locking the actuator in full-cycle position comprising a first member connected to the actuator and movable in time therewith, and a second member adapted to be placed in obstructing relation with said first member to prevent said member from moving and, remaining effective after successive oscillations of said actuator, to thereby positively lock said actuator.

118. In a calculating machine, numeral wheels, a reversible rotary actuator therefor having a full-cycle position, means for locking the actuator in full-cycle position comprising a first member connected to the actuator, movable in time therewith, and having a full-cycle position, and a second member adapted to lock said first member in said full-cycle position after successive oscillations of said actuator.

119. In a motor driven calculating machine, numeral wheels, a reversible rotary actuator therefor, means interposed between the motor and the actuator to control the driving of the actuator by the motor, means to arrest said actuator, means remaining effective after successive oscillations of the actuator, to lock said actuator and a rotation controlling means operable at the conclusion of a calculation to render said first three means operative to interrupt the driving of the actuator by the motor, to arrest the actuator, and to lock the actuator.

120. In a motor driven calculating machine, numeral wheels, a reversible rotary actuator therefor, a device for dampening the oscillations of the actuator and arresting the actuator in substantially full-cycle position when the actuator is released from the motor drive, in combination with a means rockable to operative position when the actuator has been brought to substantially full-cycle position to lock the actuator in full-cycle position.

CARL M. F. FRIDEN.